(12) United States Patent
Notsuke et al.

(10) Patent No.: US 7,206,166 B2
(45) Date of Patent: Apr. 17, 2007

(54) THIN FILM MAGNETIC HEAD AND METHOD OF MANUFACTURING THE SAME

(75) Inventors: Yasuyuki Notsuke, Chuo-ku (JP); Akihiro Oda, Chuo-ku (JP); Tetsuya Roppongi, Chuo-ku (JP)

(73) Assignee: TDK Corporation, Tokyo (JP)

( * ) Notice: Subject to any disclaimer, the term of this patent is extended or adjusted under 35 U.S.C. 154(b) by 345 days.

(21) Appl. No.: 10/638,366

(22) Filed: Aug. 12, 2003

(65) Prior Publication Data
US 2004/0042118 A1    Mar. 4, 2004

(30) Foreign Application Priority Data
Aug. 29, 2002    (JP)    ............... 2002-251631

(51) Int. Cl.
*G11B 5/187*    (2006.01)
(52) U.S. Cl. ........................ 360/122; 360/126
(58) Field of Classification Search ................ 360/126, 360/125, 122
See application file for complete search history.

(56) References Cited

U.S. PATENT DOCUMENTS

| | | | |
|---|---|---|---|
| 6,504,675 B1 * | 1/2003 | Shukh et al. ................ 360/125 |
| 6,631,054 B2 | 10/2003 | Miyazaki et al. | |
| 6,687,084 B2 * | 2/2004 | Takahashi et al. ........... 360/126 |
| 6,697,221 B2 * | 2/2004 | Sato et al. ................... 360/126 |
| 6,707,643 B2 * | 3/2004 | Takeo et al. ................. 360/125 |
| 6,710,973 B2 | 3/2004 | Okada et al. | |
| 6,836,957 B2 | 1/2005 | Kobayashi | |
| 6,940,690 B2 * | 9/2005 | Tomiyama et al. .......... 360/126 |
| 7,006,326 B2 * | 2/2006 | Okada et al. ................. 360/125 |
| 2001/0017751 A1 * | 8/2001 | Miyazaki et al. ............ 360/317 |
| 2001/0030832 A1 * | 10/2001 | Tomiyama et al. .......... 360/126 |
| 2002/0024765 A1 * | 2/2002 | Kutsuzawa et al. .......... 360/126 |

(Continued)

FOREIGN PATENT DOCUMENTS

JP    2001-236605    8/2001

(Continued)

OTHER PUBLICATIONS

"From longitudinal recording to perpendicular recording Challenge to unexplored field in HDD In The 8th MMM-Intermag Joint Conference'," Nikkei Electronics (No. 789), p. 67, col. 2, 1.25 to p. 68, col. 1, 1.15, Feb. 12, 2001.

*Primary Examiner*—William J. Klimowicz
(74) *Attorney, Agent, or Firm*—Oliff & Berridge, PLC

(57) ABSTRACT

Provided is a thin film magnetic head which enables both ensuring overwrite characteristics and preventing an adverse effect resulting from side erase, such as degradation in an output signal. An exposed surface of a magnetic pole portion layer is configured to have the shape of an asymmetric inverted trapezoid corresponding to a remaining region which remains after removing a width increasing region in the shape of a right triangle from a rectangular region on the side of a side edge. The side edge of the exposed surface is caused to correspond to the side on which a magnetic flux emitted from the magnetic pole portion layer onto a target track of a hard disk causes information to unintentionally overwrite existing information recorded on an adjacent track. This configuration allows preventing the exposed surface from extending to the adjacent track, thus preventing the adverse effect resulting from side erase.

12 Claims, 19 Drawing Sheets

U.S. PATENT DOCUMENTS

2002/0036863 A1* 3/2002 Takeo et al. ................. 360/125
2002/0063992 A1* 5/2002 Kim et al. ................... 360/125
2002/0109946 A1* 8/2002 Sato et al. ................... 360/317
2002/0170165 A1* 11/2002 Plumer et al. ............ 29/603.14
2002/0176214 A1* 11/2002 Shukh et al. ................ 360/317
2006/0002025 A1* 1/2006 Takahashi et al. .......... 360/126

FOREIGN PATENT DOCUMENTS

JP       2005322332 A  * 11/2005
WO       WO98/36410       8/1998

* cited by examiner

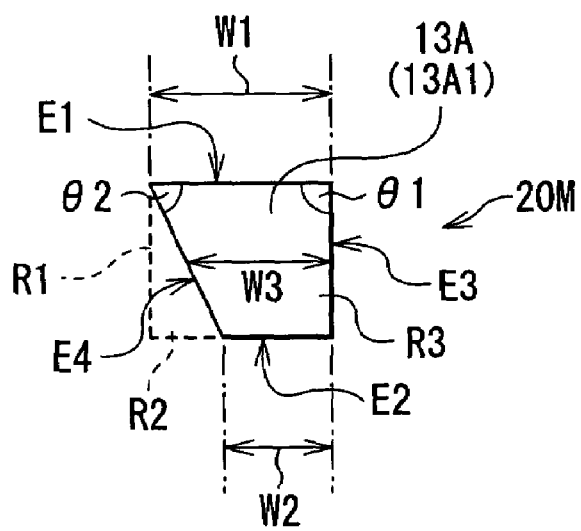
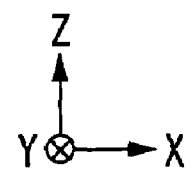
FIG. 3
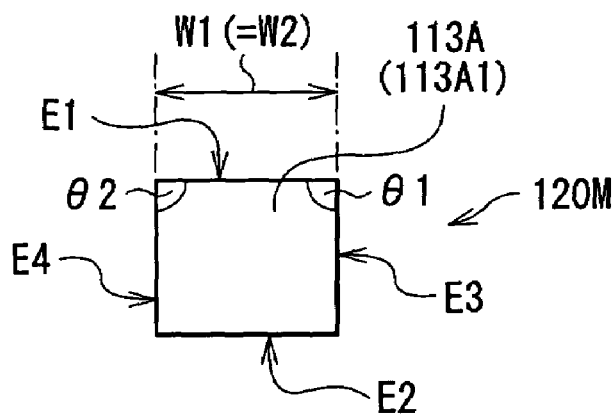
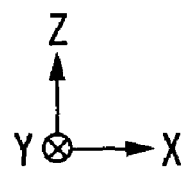
FIG. 4

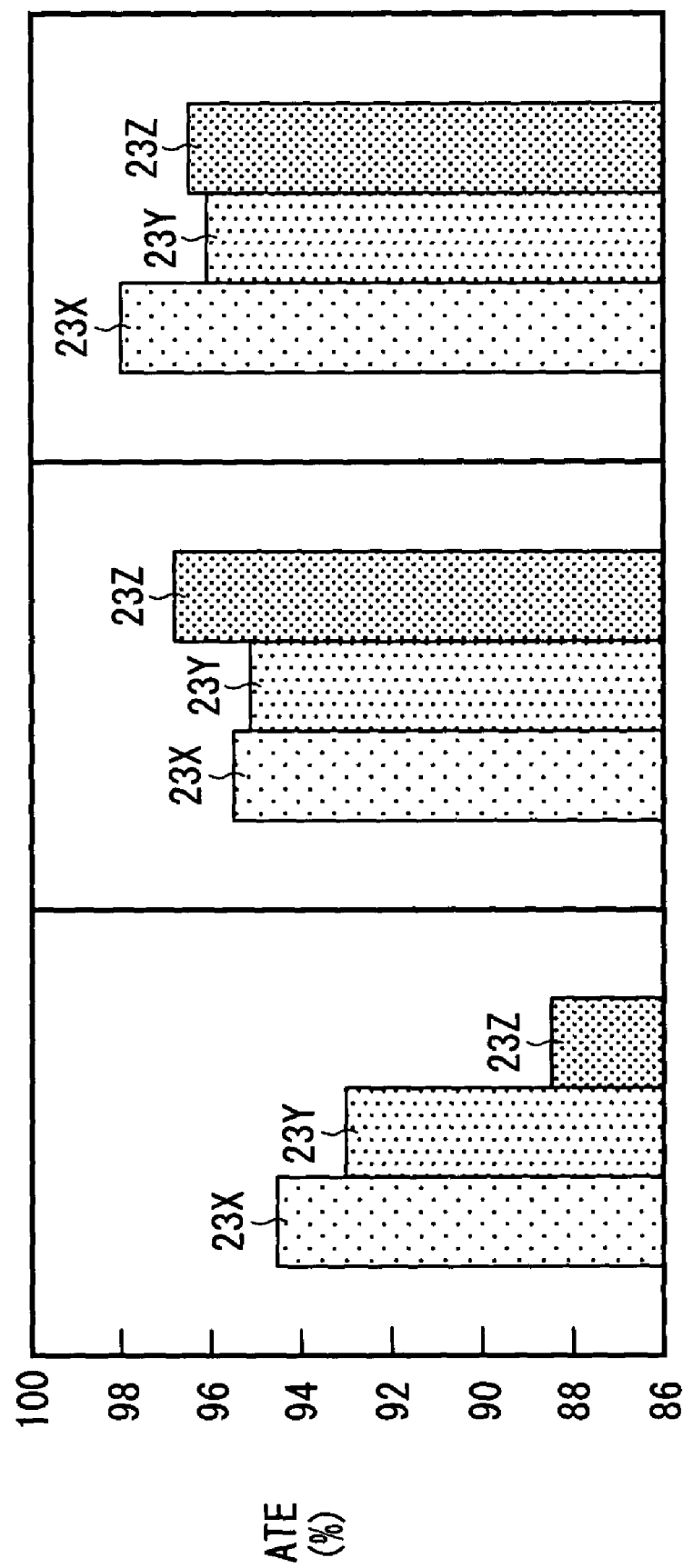

THIN FILM MAGNETIC HEAD AND METHOD OF MANUFACTURING THE SAME

BACKGROUND OF THE INVENTION

1. Field of the Invention

The invention relates to a thin film magnetic head which performs magnetic recording operation employing, for example, a vertical recording system, and a method of manufacturing a thin film magnetic head.

2. Description of the Related Art

Recently, a hard disk drive which records information on a hard disk, for example, has been in common use as an information recording apparatus. In the field of development of the hard disk drive, an improvement in performance of a thin film magnetic head is sought in accordance with an increase in a surface recording density of the hard disk. As recording systems of the thin film magnetic head, known are, for example, a longitudinal recording system which involves matching the direction of a signal magnetic field to the in-surface direction of the hard disk (i.e., the longitudinal direction thereof), and a vertical recording system which involves matching the direction of the signal magnetic field to the direction perpendicular to a surface of the hard disk. Although the longitudinal recording system is widely used at present, the vertical recording system instead of the longitudinal recording system is likely to be regarded as promising in the future, considering market trends incident to an increase in the surface recording density. The reason is that the vertical recording system has not only the capability of ensuring a high linear recording density but also the advantage that a recording medium having information recorded thereon is resistant to thermal fluctuation.

As recording systems employing the vertical recording system, there have been proposed, for example, a system which involves recording information on a hard disk having a principal part having a single-layer film structure by using a head having two magnetic poles facing each other with a gap in between at one end and magnetically coupled to each other at the other end (i.e., a ring-type head), and a system which involves recording information on a hard disk having a principal part having a two-layer film structure by using a head located perpendicularly to the hard disk (i.e., a head of single magnetic pole type). Of these systems, a combination of the single magnetic pole type head and the hard disk having the two-layer film structure receives attention as an approach having the possibility of achieving an improvement in performance of the thin film magnetic head in that the combination is remarkably superior in resistance to thermal fluctuation.

Incidentally, an improvement in recording performance of a thin film magnetic head of vertical recording type requires, for example, prevention of the effect of a malfunction generally called "side erase". The side erase refers to the phenomenon that the recording of information on a track which is a target of recording on the hard disk (hereinafter referred to as "a target track") causes the information to unintentionally overwrite existing information recorded on a track adjacent to the target track (hereinafter referred to as "an adjacent track").

The side erase is mainly caused by skew. The skew refers to the phenomenon that the movement of a suspension (that is, a leaf spring made of stainless, which supports a slider) in a track direction during recording operation of the hard disk drive causes the single magnetic pole type head to deviate from the direction of rotation of the hard disk. The occurrence of the skew causes generation of an undesired vertical magnetic field according to a magnetic flux concentrating at a location, other than an intended recording location corresponding to the target track in the single magnetic pole type head. Thus, the undesired vertical magnetic field causes information to overwrite information recorded on the adjacent track. To prevent an adverse effect resulting from the side erase, the single magnetic pole type head can be therefore configured, for example so as to reduce the amount of undesired vertical magnetic field generation, which induces the side erase.

Some suggestions have been already made as to the configuration of a thin film magnetic head designed in consideration of the above-mentioned respect. For example, the technique of partly removing a lower portion of a uniform-width end portion of a single magnetic pole type head, thus reducing the area of an end surface of the end portion, and thereby reducing the amount of undesired vertical magnetic field generation is described at page 67 in the Feb. 12, 2001 issue (No. 789) of NIKKEI ELECTRONICS.

However, this type of single magnetic pole type head has two main problems.

Firstly, the reduction of the area of the end surface of the single magnetic pole type head allows obtaining an advantage in the aspect of the prevention of the adverse effect resulting from the side erase (e.g., degradation in an output signal, etc.), whereas a decrease in the area of the end surface causes a decrease in the amount of magnetic flux for use in recording emitted from the single magnetic pole type head, and this causes a decrease in vertical magnetic field strength and thus causes deterioration in overwrite characteristics which are one of important factors that determine the recording performance of the thin film magnetic head. The overwrite characteristics refer to the characteristics of overwriting information recorded on the hard disk with new information.

Secondly, it is possible that the formation of the single magnetic pole type head having the characteristic configuration having the end portion having the lower portion partly removed requires a partial removal of the lower portion of the end portion on the side of an air bearing surface using an etching technique such as FIB (focused ion beam) process having low manufacturability. Therefore, the technique is inferior in manufacturability, and etching may do damage to the single magnetic pole type head or the periphery thereof.

SUMMARY OF THE INVENTION

The invention is designed to overcome the foregoing problems. It is a first object of the invention to provide a thin film magnetic head which is capable of both ensuring overwrite characteristics and preventing an adverse effect resulting from side erase, such as degradation in an output signal.

It is a second object of the invention to provide a method of manufacturing a thin film magnetic head, which is superior in manufacturability.

A thin film magnetic head according to a first aspect of the invention includes: a thin film coil for generating a magnetic flux; and a magnetic pole layer having a magnetic pole end surface exposed on a recording-medium-facing surface to be faced with a recording medium which moves in a predetermined travel direction, the magnetic pole layer for emitting the magnetic flux generated by the thin film coil onto the recording medium through the magnetic pole end surface, wherein the magnetic pole end surface has a shape which is formed by removing a width increasing region, which has a width increasing gradually or stepwise from the medium outflow side to the medium inflow side in the travel direction, from a rectangular region on one side of the rectangular region along the width thereof.

As employed herein, "the medium outflow side" refers to the outflow side of a flow, assuming that the movement of the recording medium is the flow. "The medium inflow side" refers to the inflow side of the flow.

In the thin film magnetic head according to the first aspect of the invention, the magnetic pole end surface of the magnetic pole layer is configured to have the shape which is formed by removing the width increasing region, which has the width increasing gradually or stepwise from the medium outflow side to the medium inflow side in the travel direction, from the rectangular region on one side of the rectangular region along the width thereof. For example, one side of the rectangular region, which the width increasing region is removed from, is determined according to the state of occurrence of side erase. Thus, this configuration enables both ensuring the overwrite characteristics and preventing the adverse effect resulting from side erase.

A thin film magnetic head according to a second aspect of the invention includes: a thin film coil for generating a magnetic flux; and a magnetic pole layer having a magnetic pole end surface exposed on a recording-medium-facing surface to be faced with a recording medium which moves in a predetermined travel direction, the magnetic pole layer for emitting the magnetic flux generated by the thin film coil onto the recording medium through the magnetic pole end surface, wherein the magnetic pole end surface has a first edge located on the medium outflow side in the travel direction, a second edge located on the medium inflow side in the travel direction, and third and fourth edges located along the width, the width of the first edge is greater than the width of the second edge and is equal to or greater than the width of the magnetic pole end surface at any position midway between the first and second edges, and either the third or fourth edge forms a right angle with the first edge.

In the thin film magnetic head according to the second aspect of the invention, the magnetic pole end surface of the magnetic pole layer is configured in such a manner that the width of the first edge is greater than the width of the second edge and is equal to or greater than the width of the magnetic pole end surface at any position midway between the first and second edges, and that either the third or fourth edge forms the right angle with the first edge. For example, whether the third or fourth edge forms the right angle with the first edge is determined according to the state of occurrence of side erase. Thus, this configuration enables both ensuring the overwrite characteristics and preventing the adverse effect resulting from side erase.

A thin film magnetic head according to a third aspect of the invention includes: a thin film coil for generating a magnetic flux; and a magnetic pole layer having a magnetic pole end surface exposed on a recording-medium-facing surface to be faced with a recording medium which moves in a predetermined travel direction, the magnetic pole layer for emitting the magnetic flux generated by the thin film coil onto the recording medium through the magnetic pole end surface, wherein the magnetic pole end surface has the shape of a trapezoid having: a first edge which is located on the medium outflow side in the travel direction and is a longer side of a pair of sides parallel to each other, the first edge forming base angles, one of which is different from the other; and a second edge which is located on the medium inflow side in the travel direction and is a shorter side of the pair of sides.

In the thin film magnetic head according to the third aspect of the invention, the magnetic pole end surface of the magnetic pole layer is configured to have the shape of the trapezoid having: the first edge which is located on the medium outflow side in the travel direction and is the longer side of the pair of sides parallel to each other, the first edge forming the base angles, one of which is different from the other; and the second edge which is located on the medium inflow side in the travel direction and is the shorter side of the pair of sides. For example, one base angle and the other base angle are set according to the state of occurrence of side erase so as to differ from each other. Thus, this configuration enables both ensuring the overwrite characteristics and preventing the adverse effect resulting from side erase.

A method of manufacturing a thin film magnetic head according to the first aspect of the invention including: a thin film coil for generating a magnetic flux; and a magnetic pole layer having a magnetic pole end surface exposed on a recording-medium-facing surface to be faced with a recording medium which moves in a predetermined travel direction, the magnetic pole layer for emitting the magnetic flux generated by the thin film coil onto the recording medium through the magnetic pole end surface includes the steps of forming a precursory magnetic pole layer, which serves as a preparatory layer for the magnetic pole layer, on an underlayer in such a manner that the precursory magnetic pole layer includes a uniform width portion; forming a buffer layer on the precursory magnetic pole layer by using a material having a lower etching rate than a material of the precursory magnetic pole layer, in such a manner that the buffer layer covers at least the uniform width portion; selectively etching the uniform width portion of the precursory magnetic pole layer on one side along the width by irradiation with ion beams at a predetermined angle relative to the direction perpendicular to an extending surface of the precursory magnetic pole layer, using the buffer layer as a mask; and polishing an end surface of a stacked structure including the precursory magnetic pole layer, thereby forming the magnetic pole end surface, whereby the magnetic pole end surface has a shape which is formed by removing a width increasing region, which has a width increasing gradually or stepwise from the medium outflow side to the medium inflow side in the travel direction, from a rectangular region on one side of the rectangular region along the width thereof.

In the method of manufacturing a thin film magnetic head according to the first aspect of the invention, the precursory magnetic pole layer, which serves as the preparatory layer for the magnetic pole layer, is first formed on the underlayer so as to include the uniform width portion. Then, the buffer layer is formed on the precursory magnetic pole layer by using the material having a lower etching rate than the material of the precursory magnetic pole layer, so as to cover at least the uniform width portion. Then, the uniform width portion of the precursory magnetic pole layer is selectively etched on one side along the width, using the buffer layer as the mask, by irradiation with the ion beams at the predetermined angle relative to the direction perpendicular to the extending surface of the precursory magnetic pole layer. Finally, the magnetic pole end surface is formed by polishing the end surface of the stacked structure including the precursory magnetic pole layer. Thus, the magnetic pole end surface of the magnetic pole layer has the shape which is formed by removing the width increasing region, which has the width increasing gradually or stepwise from the medium outflow side to the medium inflow side in the travel direction, from the rectangular region on one side of the rectangular region along the width thereof.

A method of manufacturing a thin film magnetic head according to the second aspect of the invention including: a thin film coil for generating a magnetic flux; and a magnetic pole layer having a magnetic pole end surface exposed on a recording-medium-facing surface to be faced with a recording medium which moves in a predetermined travel direction, the magnetic pole layer for emitting the magnetic flux generated by the thin film coil onto the recording medium through the magnetic pole end surface includes the steps of: forming a precursory magnetic pole layer, which serves as a preparatory layer for the magnetic pole layer, on an underlayer in such a manner that the precursory magnetic pole layer includes a uniform width portion; forming a buffer layer on the precursory magnetic pole layer by using a material having a lower etching rate than a material of the precursory magnetic pole layer, in such a manner that the buffer layer covers at least the uniform width portion; selectively etching the uniform width portion of the precursory magnetic pole layer on one side along the width by irradiation with ion beams at a predetermined angle relative to the direction perpendicular to an extending surface of the precursory magnetic pole layer, using the buffer layer as a mask; and polishing an end surface of a stacked structure including the precursory magnetic pole layer, thereby forming the magnetic pole end surface, whereby the magnetic pole end surface has a first edge located on the medium outflow side in the travel direction, a second edge located on the medium inflow side in the travel direction, and third and fourth edges located along the width, the width of the first edge is greater than the width of the second edge and is equal to or greater than the width of the magnetic pole end surface at any position midway between the first and second edges, and either the third or fourth edge forms a right angle with the first edge.

In the method of manufacturing a thin film magnetic head according to the second aspect of the invention, the magnetic pole layer is formed through the same steps as the steps of the method of manufacturing a thin film magnetic head according to the first aspect. Thus, the magnetic pole end surface of the magnetic pole layer has the first edge located on the medium outflow side in the travel direction, the second edge located on the medium inflow side in the travel direction, and the third and fourth edges located along the width. Moreover, the width of the first edge is greater than the width of the second edge and is equal to or greater than the width of the magnetic pole end surface at any position midway between the first and second edges. Furthermore, either the third or fourth edge forms the right angle with the first edge.

A method of manufacturing a thin film magnetic head according to the third aspect of the invention including: a thin film coil for generating a magnetic flux; and a magnetic pole layer having a magnetic pole end surface exposed on a recording-medium-facing surface to be faced with a recording medium which moves in a predetermined travel direction, the magnetic pole layer for emitting the magnetic flux generated by the thin film coil onto the recording medium through the magnetic pole end surface includes the steps of forming a precursory magnetic pole layer, which serves as a preparatory layer for the magnetic pole layer, on an underlayer in such a manner that the precursory magnetic pole layer includes a uniform width portion; forming a buffer layer on the precursory magnetic pole layer by using a material having a lower etching rate than a material of the precursory magnetic pole layer, in such a manner that the buffer layer covers at least the uniform width portion; selectively etching the uniform width portion of the precursory magnetic pole layer on at least one side along the width by irradiation with ion beams at a predetermined angle relative to the direction perpendicular to an extending surface of the precursory magnetic pole layer, using the buffer layer as a mask; and polishing an end surface of a stacked structure including the precursory magnetic pole layer, thereby forming the magnetic pole end surface, whereby the magnetic pole end surface has the shape of a trapezoid having: a first edge which is located on the medium outflow side in the travel direction and is a longer side of a pair of sides parallel to each other, the first edge forming base angles, one of which is different from the other; and a second edge which is located on the medium inflow side in the travel direction and is a shorter side of the pair of sides.

In the method of manufacturing a thin film magnetic head according to the third aspect of the invention, the magnetic pole layer is formed through the same steps as the steps of the method of manufacturing a thin film magnetic head according to the first aspect. Thus, the magnetic pole end surface of the magnetic pole layer has the shape of the trapezoid having: the first edge which is located on the medium outflow side in the travel direction and is the longer side of the pair of sides parallel to each other, the first edge forming the base angles, one of which is different from the other; and the second edge which is located on the medium inflow side in the travel direction and is the shorter side of the pair of sides.

In the thin film magnetic head according to the first aspect of the invention, preferably, the one side of the rectangular region, which the width increasing region is removed from, is the side on which the magnetic flux, which is emitted from the magnetic pole layer onto a target track of the recording medium through the magnetic pole end surface, causes information to overwrite existing information recorded on an adjacent track adjacent to the target track. In this case, the recording medium has the shape of a disc whose center coincides with a predetermined center point, and the one side may be the near side with respect to the center point of the recording medium in the radial direction thereof, or may be the far side with respect to the center point of the recording medium in the radial direction thereof.

In the thin film magnetic head according to the first aspect of the invention, the width increasing region may have the shape of a right triangle.

In the thin film magnetic head according to the first aspect of the invention, preferably, the magnetic pole layer includes a track width defining portion which has the magnetic pole end surface and defines a write track width of the recording medium, and the track width defining portion has a portion whose cross section parallel to the recording-medium-facing surface has a smaller portion closer to the magnetic pole end surface.

In the thin film magnetic head according to the first aspect of the invention, the magnetic pole layer may be configured to emit, through the magnetic pole end surface, the magnetic flux for magnetizing the recording medium in the direction perpendicular to a surface of the recording medium.

In the thin film magnetic head according to the second aspect of the invention, preferably, the third or fourth edge which forms the right angle with the first edge is located on the opposite side to the side on which the magnetic flux, which is emitted from the magnetic pole layer onto a target track of the recording medium through the magnetic pole end surface, causes information to overwrite existing information recorded on an adjacent track adjacent to the target track.

In the thin film magnetic head according to the third aspect of the invention, both the one base angle and the other base angle may be acute angles, or the one base angle and the other base angle may be a right angle and an acute angle, respectively.

In the method of manufacturing a thin film magnetic head according to the third aspect of the invention, the etching step may include selectively etching the uniform width portion of the precursory magnetic pole layer on both sides along the width at different etching angles, whereby both the one base angle and the other base angle are acute angles, or the etching step may include selectively etching the uniform width portion of the precursory magnetic pole layer on one side along the width, whereby the one base angle is a right angle, and the other base angle is an acute angle.

Other and further objects, features and advantages of the invention will appear more fully from the following description.

BRIEF DESCRIPTION OF THE DRAWINGS

FIG. 3 is an enlarged plan view of the configuration of an exposed surface of a magnetic pole portion layer;

FIG. 4 is a plan view of the configuration of an exposed surface of a magnetic pole portion layer constituting a thin film magnetic head of a first comparative example which is compared to the thin film magnetic head according to the embodiment of the invention;

FIGS. 23A to 23C are graphs showing the results of experiments on the state of occurrence of side erase which arises when each of the thin film magnetic heads of the embodiment and the first and second comparative examples is mounted on the hard disk drive shown in FIG. 6;

DETAILED DESCRIPTION OF THE PREFERRED EMBODIMENTS

An embodiment of the invention will be described in detail below with reference to the drawings.

Figure 1:
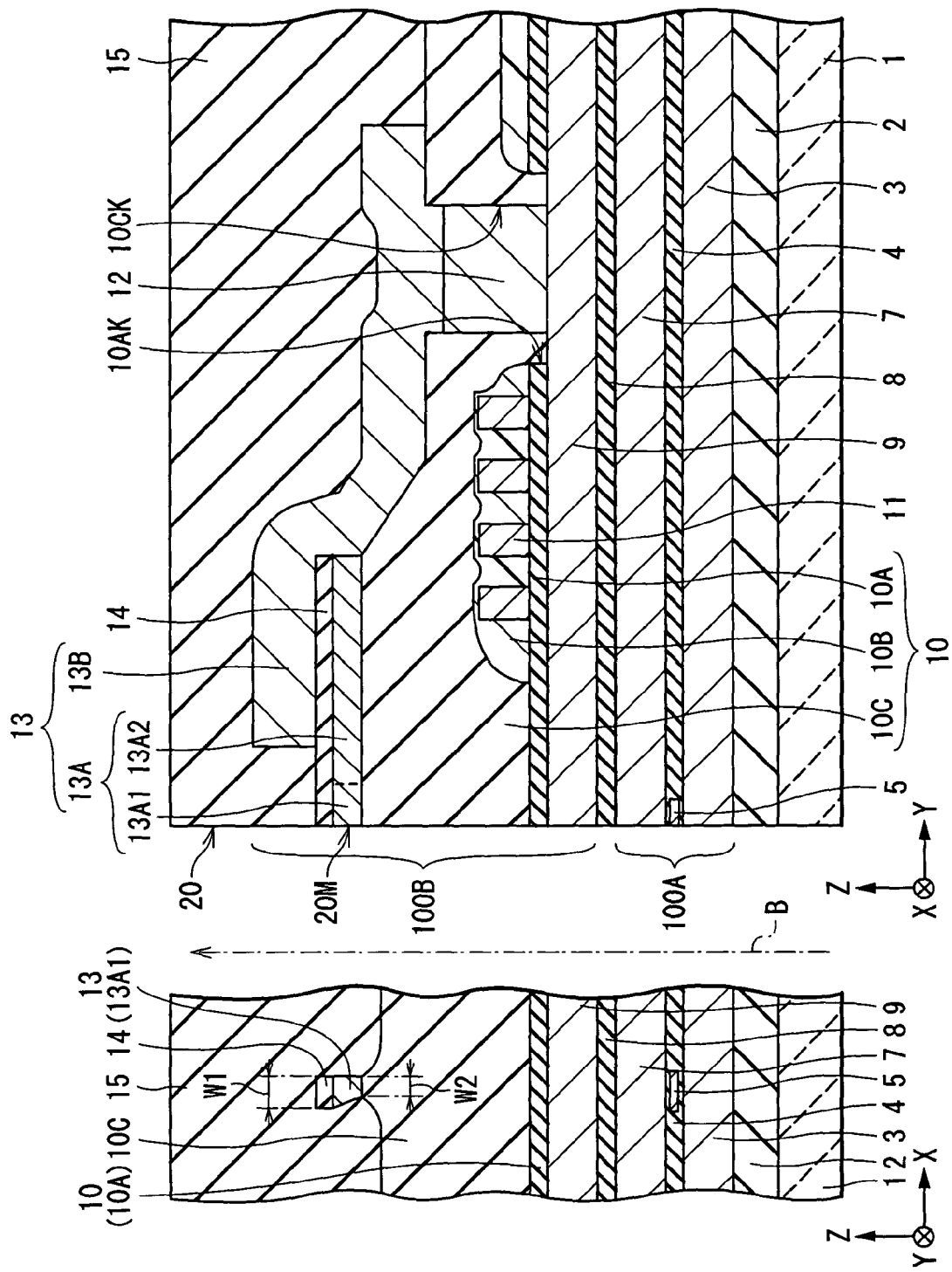
FIGS. 1A and 1B are cross-sectional views of the configuration of a thin film magnetic head according to an embodiment of the invention.
Figure 2:
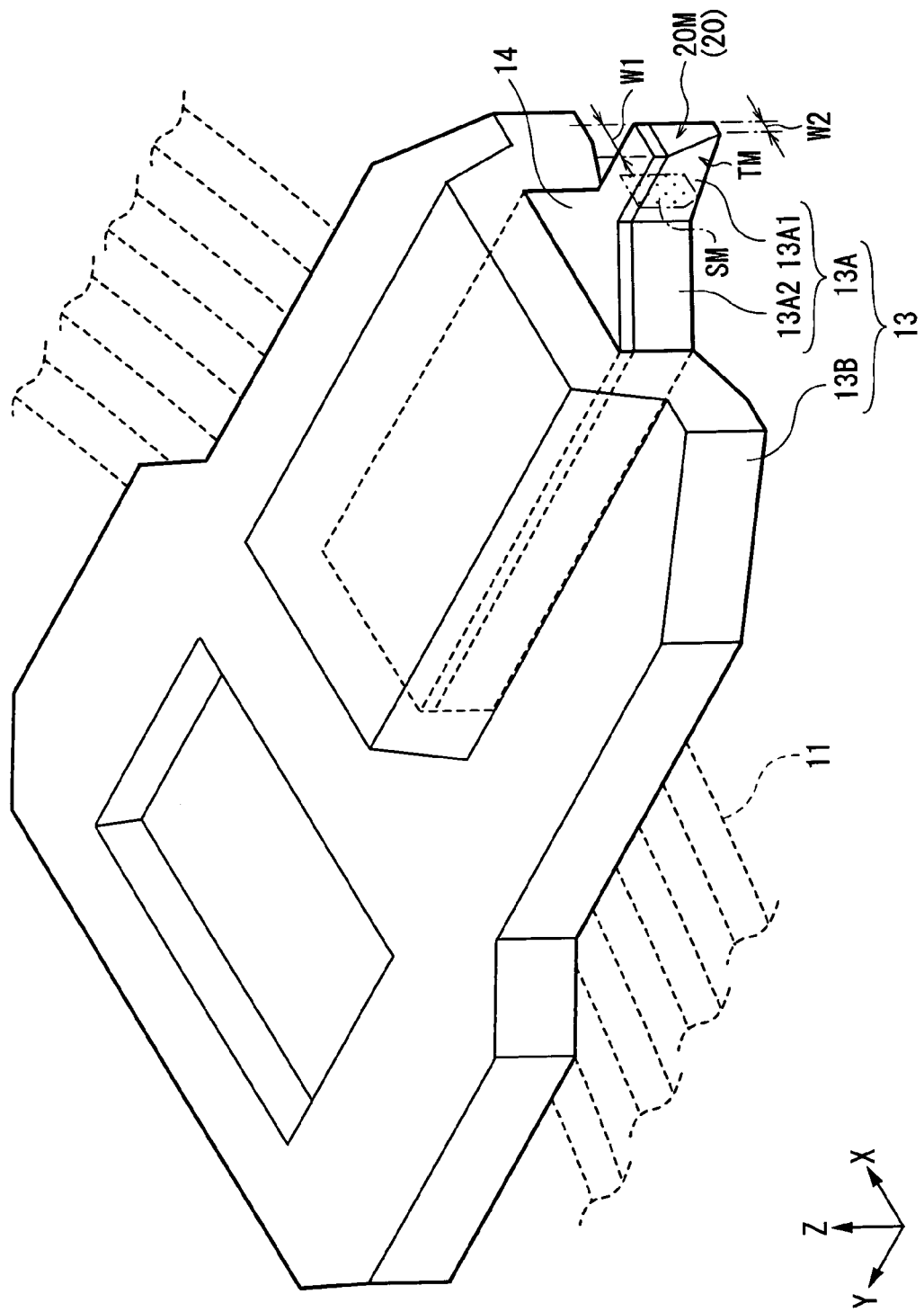
FIG. 2 is an enlarged perspective view of the configuration of a principal part of the thin film magnetic head shown in FIGS. 1A and 1B.

Firstly, the description is given with reference to FIGS. 1A and 1B and FIG. 2 with regard to the configuration of a thin film magnetic head according to an embodiment of the invention. FIGS. 1A and 1B illustrate, in cross-sectional view, the configuration of the thin film magnetic head, and FIG. 2 illustrates, in enlarged perspective view, the configuration of a principal part (i.e., a main magnetic pole layer) of the thin film magnetic head shown in FIGS. 1A and 1B. Incidentally, FIG. 1A shows a cross section parallel to an air bearing surface, and FIG. 1B shows a cross section perpendicular to the air bearing surface. An upward-pointing arrow B shown in FIGS. 1A and 1B indicates the direction in which a hard disk travels relative to the thin film magnetic head.

In the following description, the distances along the X, Y and Z axes in FIGS. 1A and 1B and FIG. 2 are expressed as "a width", "a length", and "a thickness or a height", respectively. The side close to the air bearing surface, as viewed along the Y axis, is expressed as "the front or frontward side", and the opposite side is expressed as "the rear or rearward side". The expressions for these drawings are the same as those for FIG. 3 and the following drawings as will appear later.

For the purpose of recording information on a recording medium such as the hard disk, the thin film magnetic head according to the embodiment is mounted on a magnetic recording and reproducing apparatus such as a hard disk drive so as to function as a device for use in magnetic recording. For example, the thin film magnetic head is a composite head capable of performing both reproducing and recording functions. As shown in FIGS. 1A and 1B, the thin film magnetic head has a stacked structure comprising a substrate 1 made of a ceramic material such as $Al_2O_3$—TiC fine ceramics, an insulating layer 2 made of, for example, aluminum oxide ($Al_2O_3$) (hereinafter referred to as "alumina"), a reproducing head part 100A which performs reproducing processing utilizing a magnetoresistance (MR) effect, a nonmagnetic layer 8 made of, for example, alumina, a recording head part 100B which performs recording processing employing a vertical recording system, and an overcoat layer 15 made of, for example, alumina, which are stacked on the substrate 1 in this sequence.

For example, the reproducing head part 100A has a stacked structure comprising a bottom shield layer 3, a shield gap film 4, and a top shield layer 7, which are stacked in this sequence. An MR (magnetoresistive) element 5 which functions as a magnetic reproducing device is embedded in the shield gap film 4 in such a manner that one end surface of the MR element 5 is exposed on an air bearing surface 20. The air bearing surface 20 refers to a facing surface of the thin film magnetic head to be faced with the hard disk (i.e., a recording-medium-facing surface).

The bottom shield layer 3 and the top shield layer 7 mainly serve to magnetically shield the MR element 5 from therearound. For example, the bottom shield layer 3 and the top shield layer 7 are made of a magnetic material such as a nickel-iron alloy (NiFe) (hereinafter referred to as "Permalloy (its trade name)", and containing 80 wt % Ni and 20 wt % Fe), and each of the layers 3 and 7 has a thickness of about 1.0 µm to 2.0 µm.

The shield gap film 4 serves to magnetically and electrically isolate the MR element 5 from the bottom shield layer 3 and the top shield layer 7. For example, the shield gap film 4 is made of a nonmagnetic nonconductive material such as alumina and has a thickness of about 0.1 µm to 0.2 µm.

The MR element 5 serves to perform reproducing processing utilizing, for example, a giant magnetoresistance (GMR) effect, a tunneling magnetoresistance (TMR) effect, or the like.

For example, the recording head part 100B has a stacked structure comprising an auxiliary magnetic pole layer 9, a gap layer 10 having a thin film coil 11 embedded therein, a coupling portion 12, and a main magnetic pole layer 13 magnetically coupled to the auxiliary magnetic pole layer 9 with the coupling portion 12 in between through an opening 10CK in the gap layer 10, which are stacked in this sequence. As employed herein, the main magnetic pole layer 13 corresponds to a specific example of "a magnetic pole layer" of the invention.

The auxiliary magnetic pole layer 9 mainly functions to return a magnetic flux emitted from the main magnetic pole layer 13 via the hard disk (not shown). For example, the auxiliary magnetic pole layer 9 is made of a magnetic material such as Permalloy (containing 80 wt % Ni and 20 wt % Fe) and has a thickness of about 1.0 µm to 2.0 µm.

The gap layer 10 includes a gap layer portion 10A having an opening 10AK, the portion 10A being formed on the auxiliary magnetic pole layer 9; a gap layer portion 10B which is formed on the gap layer portion 10A so as to cover the thin film coil 11 between and around the windings thereof; and a gap layer portion 10C having the opening 10CK, the portion 10C being formed so as to partly cover the gap layer portions 10A and 10B.

The gap layer portion 10A is made of a nonmagnetic nonconductive material such as alumina or silicon oxide ($SiO_2$) and has a thickness of about 0.1 µm to 1.0 µm. The gap layer portion 10B is made of, for example, a photoresist (a photosensitive resin), spin on glass (SOG), or the like, which exhibits fluidity through heating. The gap layer portion 10C is made of a nonmagnetic material such as alumina or silicon oxide and has a greater thickness than the gap layer portion 10B.

The thin film coil 11 mainly serves to generate a magnetic flux for use in recording. The thin film coil 11 is made of a highly-conductive material such as copper (Cu) and has a winding structure in which a wire is wound around the coupling portion 12 in a spiral fashion. In FIG. 1B, there are shown only some of a plurality of windings constituting the thin film coil 11.

The coupling portion 12 serves to provide magnetic coupling between the auxiliary magnetic pole layer 9 and the main magnetic pole layer 13, and is made of a magnetic material such as Permalloy (containing 80 wt % Ni and 20 wt % Fe).

The main magnetic pole layer 13 mainly serves to contain a magnetic flux generated by the thin film coil 11 and emit the magnetic flux onto the hard disk (not shown). For example, the main magnetic pole layer 13 includes a magnetic pole portion layer 13A which is formed on a frontward portion of the gap layer portion 10C, and a yoke portion layer 13B which is formed so as to cover a rearward portion of the magnetic pole portion layer 13A with a buffer layer 14 in between, the buffer layer 14 being formed on the magnetic pole portion layer 13A.

The magnetic pole portion layer 13A mainly functions as a portion for emitting a magnetic flux. For example, the magnetic pole portion layer 13A is made of a magnetic material having a higher saturation magnetic flux density than the yoke portion layer 13B, and has a thickness of about 0.1 µm to 1.0 µm. Examples of a material used for the magnetic pole portion layer 13A are a material containing iron and nitrogen, a material containing iron, zirconia and oxygen, a material containing iron and nickel, and so forth. More specifically, at least one material can be selected from Permalloy (containing 45 wt % Ni and 55 wt % Fe), iron nitride (FeN), an iron-cobalt alloy (FeCo), an alloy containing iron (FeM), and an alloy containing iron and cobalt (FeCoM). As employed herein, "M" in the above structural formulas (FeM and FeCoM) indicates at least one of the following: for example, nickel, nitrogen, carbon (C), boron (B), silicon, aluminum, titanium (Ti), zirconia, hafnium (Hf), molybdenum (Mo), tantalum (Ta), niobium (Nb), and copper.

For example, as shown in FIG. 2, the magnetic pole portion layer 13A includes a front end portion 13A1 which defines a write track width of the hard disk, and a rear end portion 13A2 magnetically coupled to the front end portion 13A1, which are arranged in this sequence as viewed on the side of the air bearing surface 20. One end surface (i.e., an exposed surface) 20M of the front end portion 13A1 is exposed on the air bearing surface 20. Incidentally, the description is given later with regard to the detailed configuration of the magnetic pole portion layer 13A including the configuration of the exposed surface 20M (see FIG. 3). As employed herein, the exposed surface 20M corresponds to a specific example of "a magnetic pole end surface" of the invention, and the front end portion 13A1 corresponds to a specific example of "a track width defining portion" of the invention.

The yoke portion layer 13B mainly functions as a portion for containing a magnetic flux. For example, the yoke portion layer 13B is made of a magnetic material having excellent corrosion resistance and higher resistance than the magnetic pole portion layer 13A, and has a thickness of about 1.0 μm to 2.0 μm. For instance, when a material having the same composition as the material used for the magnetic pole portion layer 13A is used as a material used for the yoke portion layer 13B, it is preferable that the yoke portion layer 13B contain a lower percentage of iron in order to have a lower saturation magnetic flux density than the magnetic pole portion layer 13A.

The yoke portion layer 13B is magnetically coupled to both side surfaces of the rear end portion 13A2 of the magnetic pole portion layer 13A and is also magnetically coupled to a rear end surface of the rear end portion 13A2. As distinct from the magnetic pole portion layer 13A, the yoke portion layer 13B is not exposed on the air bearing surface 20 but is, for example, located rearward by about 1.5 μm or more with respect to the air bearing surface 20.

The buffer layer 14 is mainly used to form the magnetic pole portion layer 13A so as to form the front end portion 13A1 having a characteristic configuration to be described later, and for example, the buffer layer 14 has substantially the same configuration in plan view as the magnetic pole portion layer 13A. Incidentally, the description is given later with regard to details about the function of the buffer layer 14 to form the magnetic pole portion layer 13A (see FIGS. 14 and 15 and FIGS. 18 and 19). For example, the buffer layer 14 is made of a material having a lower etching rate than the material of the magnetic pole portion layer 13A, specifically a nonmagnetic insulating material such as a material containing nickel copper, titanium or tantalum, or alumina or silicon oxide, and the layer 14 has a thickness of about 0.1 μm to 1.0 μm.

Next, the description is given with reference to FIGS. 1A to 3 with regard to the detailed configuration of the magnetic pole portion layer 13A. FIG. 3 illustrates, in enlarged plan view, the configuration of the exposed surface 20M of the magnetic pole portion layer 13A.

As shown in FIG. 3, the exposed surface 20M of the front end portion 13A1 constituting a part of the magnetic pole portion layer 13A has a shape which is formed by removing a width increasing region R2, which has a width increasing gradually from the medium outflow side to the medium inflow side, from a rectangular region R1 on one side of the region R1 along the width of the region R1 (i.e., along the X axis in FIG. 3). More specifically, the exposed surface 20M has an upper edge E1 (a first edge) located on the medium outflow side and having a width W1 which defines the write track width of the hard disk, a lower edge E2 (a second edge) located on the medium inflow side and having a width W2, and two side edges E3 and E4 (third and fourth edges) located along the width. The exposed surface 20M has the shape corresponding to a remaining region R3 which remains after removing the width increasing region R2, which has the width increasing gradually from the side of the upper edge E1 to the side of the lower edge E2, from the rectangular region R1 on one side of the region R1 (e.g., on the side of the side edge E4) along the width of the region R1 (i.e., along the X axis in FIG. 3). As employed herein, "the medium outflow side" refers to the outflow side of a flow and corresponds to, for example, the upper side of FIG. 3, assuming that the travel of the hard disk in a travel direction B (see FIGS. 1A and 1B) is the flow. "The medium inflow side" refers to the inflow side of the flow and corresponds to, for example, the lower side of FIG. 3.

"One side" of the rectangular region R1, which the width increasing region R2 is removed from, is determined according to the state of occurrence of side erase during recording operation of the thin film magnetic head. Specifically, "one side" refers to the side on which a magnetic flux emitted from the main magnetic pole layer 13 onto a target track of the hard disk causes information to overwrite existing information recorded on an adjacent track adjacent to the target track. More specifically, for example when the main magnetic pole layer 13 is faced with the hard disk having the shape of a disc whose center coincides with a predetermined center point, "one side" refers to the far side with respect to the center point of the hard disk in the radial direction thereof. Incidentally, the side on which overwriting takes place over a wider range, for example, is defined as "one side", when overwriting occurs on the adjacent track on both one and the other sides of the rectangular region R1 as well as one side thereof along the width thereof. The description is given later with regard to a detailed relation between "one side" and the state of occurrence of side erase (see FIGS. 7A to 9C).

The more specific description is given with regard to the configuration of the exposed surface 20M. The exposed surface 20M has the shape of an asymmetric inverted trapezoid having the upper edge E1 which is a longer side of a pair of sides parallel to each other, the lower edge E2 which is a shorter side of the pair of sides, an angle θ1 (i.e., a base angle) between the side edge E3 and the upper edge E1, and an angle θ2 (i.e., a base angle) between the side edge E4 and the upper edge E1 which is different from the angle θ1. More specifically, the width W1 of the upper edge E1 is greater than the width W2 of the lower edge E2 (W1>W2) and is equal to or greater than a width W3 of the exposed surface 20M at any position midway between the upper edge E1 and the lower edge E2 (W1≧W3). In the embodiment, for example, the side edge E4 has the form of a straight line and the width increasing region R2 has the shape of a right triangle, and more specifically, the angle θ1 is a right angle and the angle θ2 is an acute angle. Conversely, the angles θ1 and θ2 may be the acute angle and the right angle, respectively, and whether the angle θ1 or θ2 is the right angle is determined according to the state of occurrence of side erase, as in the case of "one side" as mentioned above. The angle θ2 lies between, for example, about 81 and 83 degrees inclusive.

As shown in FIG. 2, the width of the front end portion 13A1 along the length (i.e., along the Y axis in FIG. 2) is the uniform width W1 on the side of the upper edge E1 and is narrower closer to the exposed surface 20M on the side of the lower edge E2, decreasing from the width W1 to the width W2. More specifically, the front end portion 13A1 has a tapered surface TM on the side of the side edge E4, and the area of a cross section SM of the portion 13A1 parallel to the air bearing surface 20 is smaller closer to the exposed surface 20M.

Incidentally, the rear end portion 13A2 has, for example, a rearward width which is a uniform width (of, e.g., 2.0 µm) greater than the width W1 of the upper edge of the front end portion 13A1, and a frontward width which is narrower closer to the front end portion 13A1.

Next, the description is given with reference to FIGS. 1A to 3 with regard to the operation of the thin film magnetic head.

The thin film magnetic head performs recording operation in the following manner. A magnetic flux is generated by the thin film coil 11 when an external circuit (not shown) feeds a current through the thin film coil 11 of the recording head part 100B. The generated magnetic flux is mainly contained in the main magnetic pole layer 13, and the magnetic flux flows through the yoke portion layer 13B and into the magnetic pole portion layer 13A. Then, the magnetic flux is emitted onto the hard disk (not shown) through the exposed surface 20M of the portion 13A1, and thereafter the magnetic flux is returned to the auxiliary magnetic pole layer 9 via the hard disk. During this operation, a magnetic field for use in recording (i.e., a vertical magnetic field), which serves to magnetize the hard disk in the direction perpendicular to a surface of the hard disk, is generated in accordance with the magnetic flux emitted from the front end portion 13A1, and the surface of the hard disk is magnetized by the vertical magnetic field. Thus, information is magnetically recorded on the hard disk.

Reproducing is performed in the following manner. A resistance value of the MR element 5 changes according to a signal magnetic field for use in reproducing generated from the hard disk, when a sense current is fed through the MR element 5 of the reproducing head part 100A. This resistance change is detected as a change in the sense current, and thus, information recorded on the hard disk is magnetically read out.

In the thin film magnetic head according to the embodiment, the exposed surface 20M of the front end portion 13A1 constituting a part of the magnetic pole portion layer 13A has the shape of the asymmetric inverted trapezoid which is formed by removing the width increasing region R2 in the shape of the right triangle from the rectangular region R1 on the side of the side edge E4. Thus, the thin film magnetic head is capable of both ensuring overwrite characteristics and preventing an adverse effect resulting from side erase. The reason is as follows.

Firstly, the description is given with reference to FIGS. 4 to 9C with regard to the aspect of the prevention of the adverse effect resulting from side erase.

Figure 5:
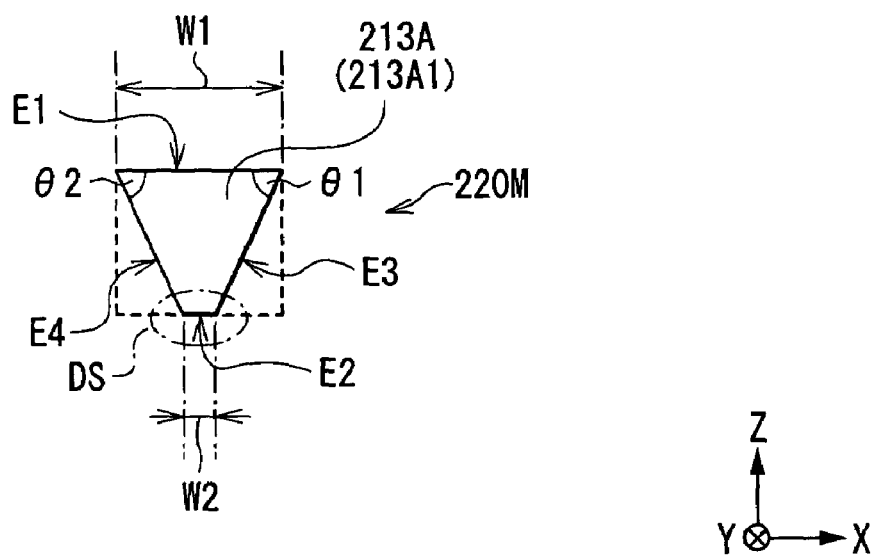
FIG. 5 is a plan view of the configuration of an exposed surface of a magnetic pole portion layer constituting a thin film magnetic head of a second comparative example which is compared to the thin film magnetic head according to the embodiment of the invention.
Figure 6:
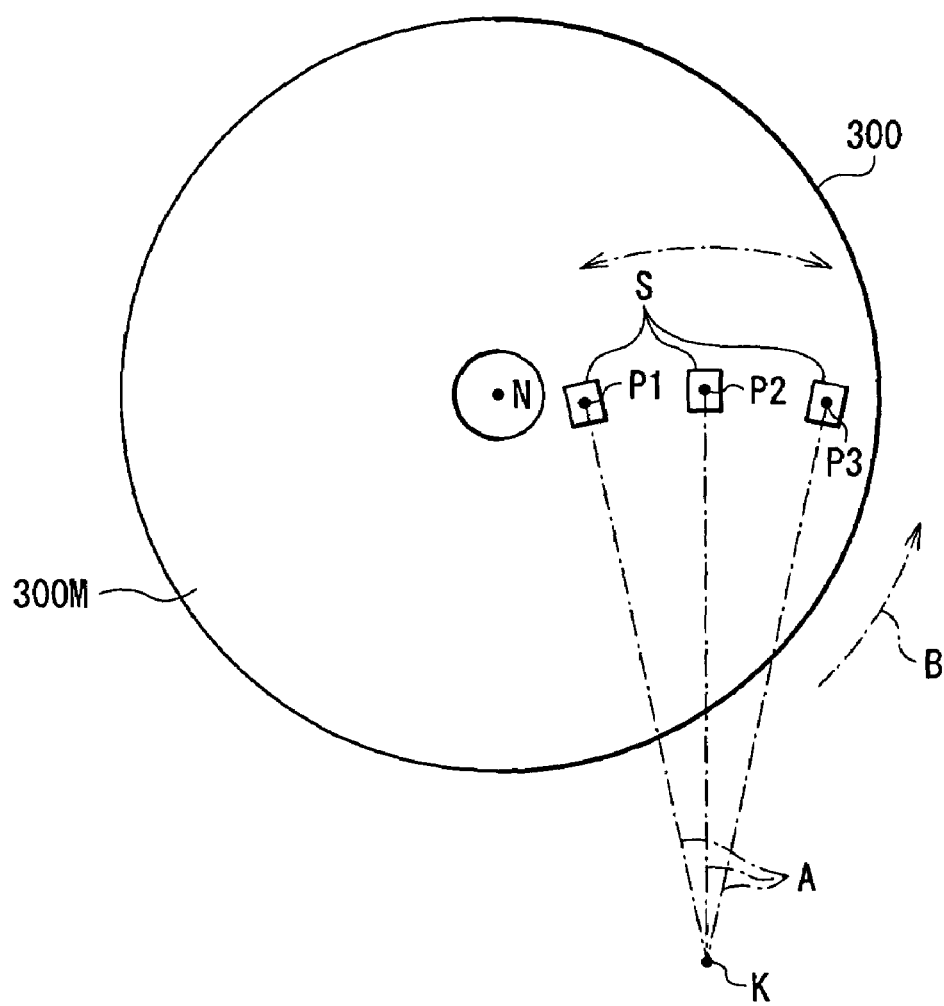
FIG. 6 is a schematic plan view of the configuration of a hard disk drive on which the thin film magnetic head is mounted.

FIG. 4 illustrates, in plan view, the configuration of an exposed surface 120M of a magnetic pole portion layer 113A (a front end portion 113A1) constituting a thin film magnetic head of a first comparative example which is compared to the thin film magnetic head according to the embodiment. FIG. 5 illustrates, in plan view, the configuration of an exposed surface 220M of a magnetic pole portion layer 213A (a front end portion 213A1) constituting a thin film magnetic head of a second comparative example. Both FIGS. 4 and 5 correspond to FIG. 3. FIG. 6 shows a schematic representation of the configuration of a hard disk drive on which each of the thin film magnetic heads of the embodiment and the first and second comparative examples is mounted. FIGS. 7A to 9C are illustrations of assistance in explaining the state of occurrence of side erase which arises when each thin film magnetic head is mounted on the hard disk drive shown in FIG. 6. FIGS. 7A to 7C, FIGS. 8A to 8C, and FIGS. 9A to 9C show the first comparative example, the second comparative example, and the embodiment, respectively. FIGS. 7A, 8A and 9A, FIGS. 7B, 8B and 9B, and FIGS. 7C, 8C and 9C correspond to positions P1, P2, and P3 on a hard disk shown in FIG. 6, respectively. In FIG. 6, an arm A is shown in linear form for the sake of simplicity of the drawing.

As shown in FIG. 4, the exposed surface 120M of the first comparative example has the same configuration as the exposed surface 20M of the embodiment, except that the exposed surface 120M is rectangular in general shape: more specifically not only the base angle between the side edge E3 and the upper edge E1 but also the base angle between the side edge E4 and the upper edge E1 is a right angle. As shown in FIG. 5, the exposed surface 220M of the second comparative example has the same configuration as the exposed surface 20M, except that the exposed surface 220M has the general shape of a symmetric inverted trapezoid: more specifically not only the base angle between the side edge E4 and the upper edge E1 but also the base angle between the side edge E3 and the upper edge E1 is an acute angle.

As shown in FIG. 6, when the hard disk drive is configured to guide the arm A around a guide pivot K over a hard disk 300 having the shape of a disc whose center coincides with a center point N, a slider S provided on one end of the arm A moves over a recording surface 300M of the hard disk 300 in the radial direction thereof. When this type of hard disk drive is used, the states of occurrence of side erase vary considerably according to the shape of the exposed surface of the magnetic pole portion layer in the case where skew occurs when the hard disk 300 moving (or rotating) in the travel direction B undergoes recording processing using the thin film magnetic head mounted on the slider S, provided that the position P1 is closer to the center point N in an orbit of movement of the slider S, that the position P2 is at about the center in the orbit, and that the position P3 is farther away from the center point N in the orbit.

Figure 7C:
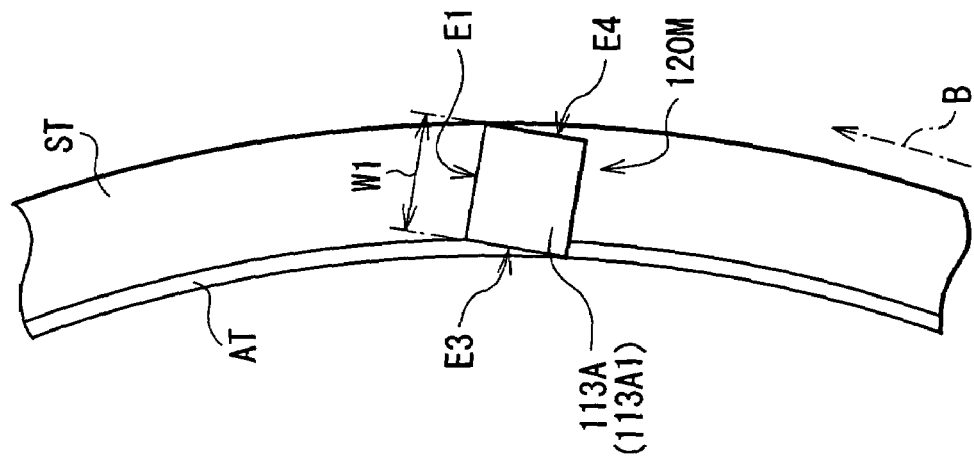
FIGS. 7A to 7C are plan views of assistance in explaining the state of occurrence of side erase which arises when the thin film magnetic head of the first comparative example is mounted on the hard disk drive shown in FIG. 6.
Figure 7B:
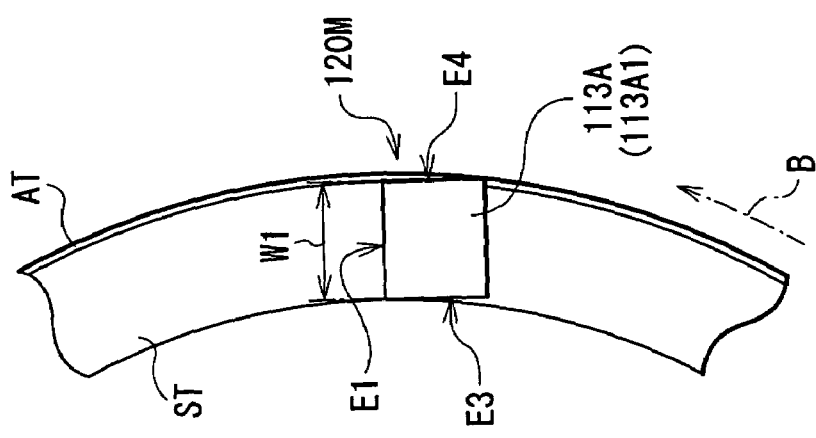
Figure 7A:
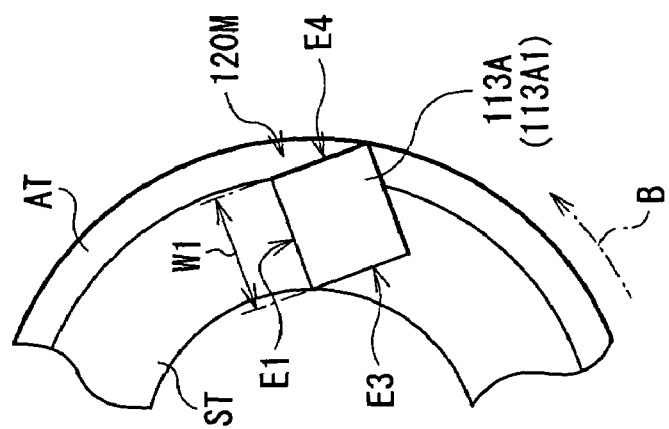

In the case of the first comparative example (see FIGS. 7A to 7C), the occurrence of skew causes a relatively great adverse effect resulting from side erase. More specifically, at the position P1, the exposed surface 120M is greatly skewed in the inward direction of the hard disk 300 (i.e., the direction nearer to the center point N) (hereinafter referred to as "an inward direction") as shown in FIG. 7A. Due to this skew, besides writing on a target track ST by the upper edge E1, overwriting is unintentionally performed over a wide range of an adjacent track AT located outward relative to the target track ST by the side edge E4 extending off the target track ST in the outward direction of the hard disk 300 (i.e., the direction farther away from the center point N) (hereinafter referred to as "an outward direction"). At the position P2, the exposed surface 120M is skewed in the inward direction as shown in FIG. 7B, as in the case of the position P1. Due to this skew, unintentional overwriting takes place on the adjacent track AT located outward relative to the target track ST. However, the overwriting takes place in a narrower range of the adjacent track AT, because the skew angle of the exposed surface 120M at the position P2 is smaller than the skew angle thereof at the position P1. At the position P3, the exposed surface 120M is skewed in the outward direction as shown in FIG. 7C, as distinct from the cases of the positions P1 and P2. Due to this skew, slight overwriting is unintentionally performed on the adjacent track AT located inward relative to the target track ST by the side edge E3 extending off the target track ST in the inward direction. Therefore, the recording processing using the thin film magnetic head of the first comparative example is more likely to interfere with normal recording operation, because of causing a marked increase in the range of overwriting on the adjacent track AT, in particular at the position P1 at which the target track ST has the smallest curvature radius.

Figure 8C:
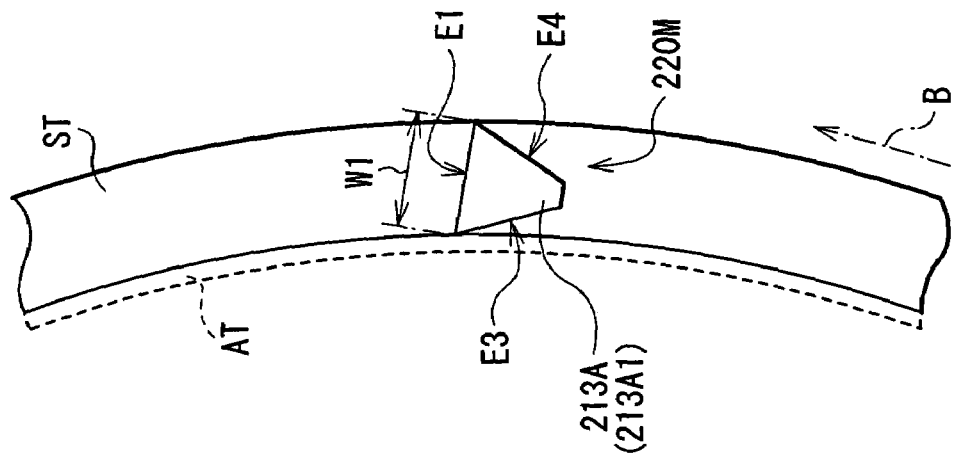
FIGS. 8A to 8C are plan views of assistance in explaining the state of occurrence of side erase which arises when the thin film magnetic head of the second comparative example is mounted on the hard disk drive shown in FIG. 6.
Figure 8B:
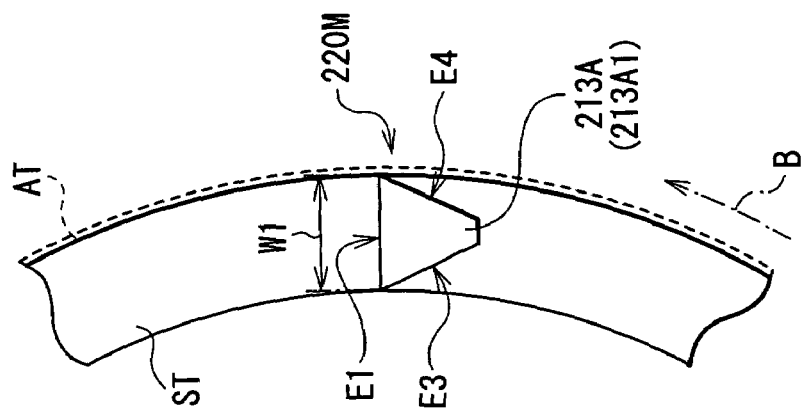
Figure 8A:
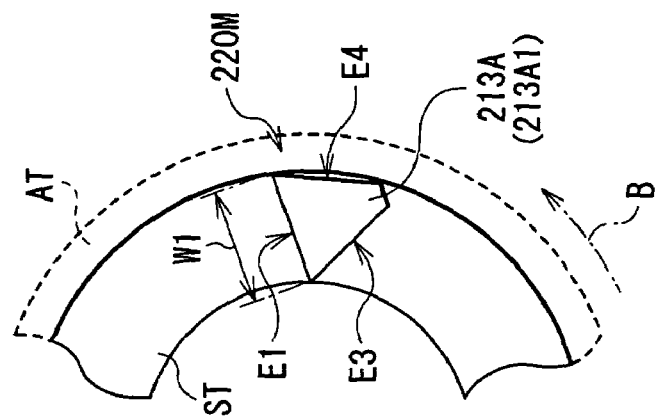

In the case of the second comparative example (see FIGS. 8A to 8C), because of the characteristic configuration of the exposed surface 220M in the shape of the symmetric inverted trapezoid, neither of the side edges E3 and E4 extends off the target track ST and to the adjacent track AT even when the exposed surface 220M is skewed in either the inward or outward direction during the occurrence of skew, as shown in FIGS. 8A to 8C. Therefore, the recording processing using the thin film magnetic head of the second comparative example allows satisfactory prevention of the adverse effect resulting from side erase at all the positions P1 to P3.

Figure 9C:
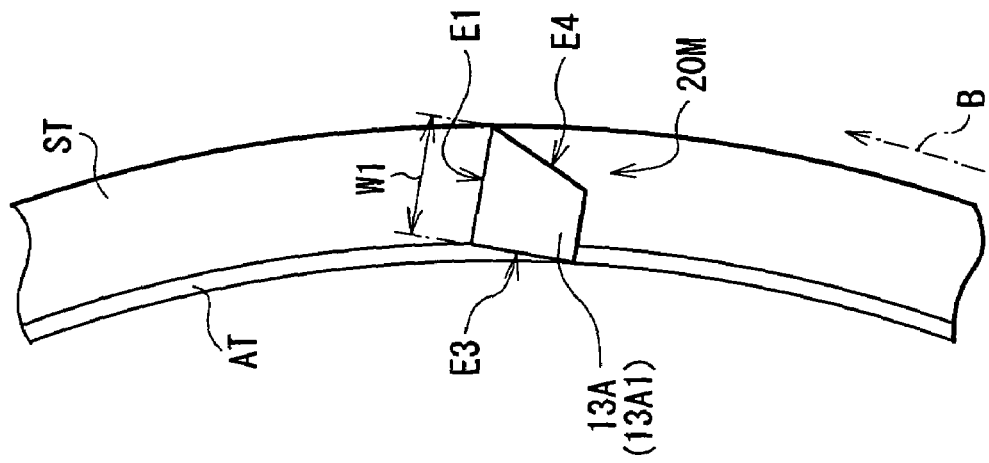
FIGS. 9A to 9C are plan views of assistance in explaining the state of occurrence of side erase which arises when the thin film magnetic head according to the embodiment of the invention is mounted on the hard disk drive shown in FIG. 6.
Figure 9B:
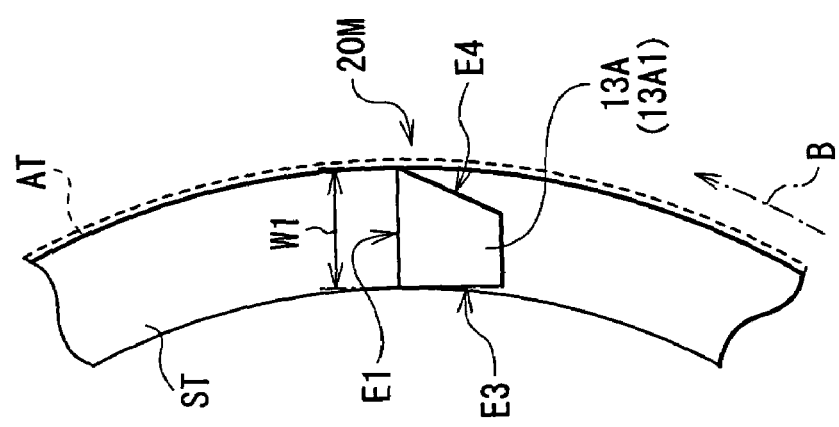
Figure 9A:
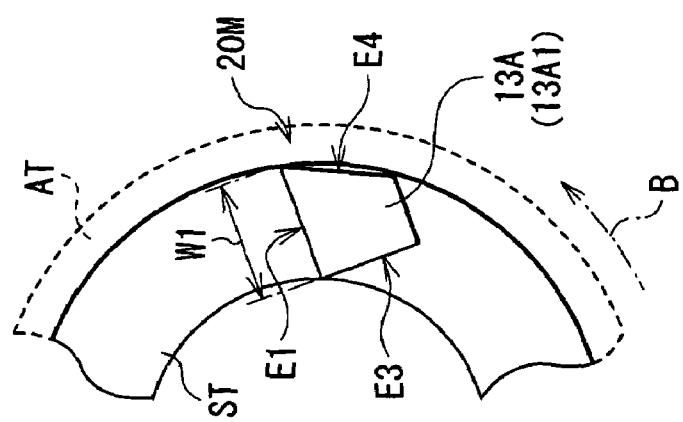

In the case of the embodiment (see FIGS. 9A to 9C), because of the characteristic configuration of the exposed surface 20M in the shape of the asymmetric inverted trapezoid, the side edge E4 does not extend to the adjacent track AT located outward relative to the target track ST at the positions P1 and P2 at which the exposed surface 20M is skewed in the inward direction during the occurrence of skew, as shown in FIGS. 9A and 9B. However, the side edge E3 extends to the adjacent track AT located inward relative to the target track ST at the position P3 at which the exposed surface 20M is skewed in the outward direction, as shown in FIG. 9C. Due to this, slight overwriting is unintentionally performed on the adjacent track AT by the side edge E3. Therefore, the recording processing using the thin film magnetic head of the embodiment allows satisfactory prevention of the adverse effect resulting from side erase at the positions P1 and P2, and allows prevention of the adverse effect resulting from side erase at the position P3 to such an extent that normal recording operation is not interfered with. Incidentally, "one side" and "whether the angle θ1 or θ2 is the right angle" as mentioned above are determined according to the state of occurrence of side erase shown in FIGS. 9A to 9C, more specifically conditions such as the region in which side erase occurs (that is, whether side erase occurs inward or outward relative to the exposed surface 20M) and the range in which side erase occurs (that is, whether side erase occurs over a wider range inward or outward).

Next, the description is given with reference to FIGS. 3 to 5 with regard to the aspect of the ensuring of the overwrite characteristics.

Since the front end portion 13A1 of the magnetic pole portion layer 13A functions as the portion for emitting a magnetic flux as mentioned above, the amount of magnetic flux emission depends on the area of the exposed surface 20M corresponding to an outlet through which the magnetic flux is emitted, and thus a larger area of the exposed surface 20M yields higher vertical magnetic field strength. When the thin film magnetic heads of the embodiment and the first and second comparative examples are compared in consideration of the above-mentioned respect, it is apparent from FIGS. 3 to 5 that the increasing order of the area of the exposed surface, from smallest to largest, is the second comparative example (i.e., the exposed surface 220M shown in FIG. 5), the embodiment (i.e., the exposed surface 20M shown in FIG. 3), and the first comparative example (i.e., the exposed surface 120M shown in FIG. 4), and thus the increasing order of the vertical magnetic field strength, from lowest to highest, is the same as the above-mentioned order. Therefore, the first comparative example having the exposed surface having the largest area can attain the highest vertical magnetic field strength capable of performing intentional overwriting processing, whereas the second comparative example having the exposed surface having the smallest area is more unlikely to perform the overwriting processing because of insufficient vertical magnetic field strength. The embodiment can attain sufficient vertical magnetic field strength such that overwriting can be performed, although the field strength of the embodiment is lower than that of the first comparative example.

The following conclusion is derived by considering both of the above-described aspects of the prevention of the adverse effect resulting from side erase and the ensuring of the overwrite characteristics. More specifically, the first comparative example having the exposed surface 120M in the rectangular shape allows ensuring the overwrite characteristics but causes a serious adverse effect resulting from side erase, in particular in an inward region of the hard disk 300. On the other hand, the second comparative example having the exposed surface 220M in the shape of the symmetric inverted trapezoid allows preventing the adverse effect resulting from side erase but has the problem of causing deterioration in the overwrite characteristics. Therefore, the respective advantages of the first and second comparative examples are taken into account so that the exposed surface 20M has the shape of the asymmetric inverted trapezoid. Thus, the exposed surface 20M permits preventing the adverse effect resulting from side erase, such as degradation in an output signal, and thereby ensuring normal recording operation, and also permits ensuring the overwrite characteristics and thereby normally performing the processing of overwriting information.

Besides having the aforementioned configuration, the embodiment is configured in such a manner that the area of the cross section SM of the front end portion 13A1 parallel to the air bearing surface 20 is smaller closer to the exposed surface 20M as shown in FIG. 2, and thus a flow path of a magnetic flux through the front end portion 13A1 is more intensively focused closer to the exposed surface 20M. In this case, the magnetic flux flows through the front end portion 13A1 and to the exposed surface 20M while concentrating along the length (i.e., along the Y axis in FIG. 2), and this prevents magnetic flux saturation. Therefore, the embodiment allows guiding a necessary and sufficient magnetic flux to the exposed surface 20M because of preventing the magnetic flux saturation, and thus permits ensuring the vertical magnetic field strength also in the aspect of the focusing of magnetic flux.

In the embodiment, the configuration of the exposed surface 20M is not limited to the configuration shown in FIG. 3 but may be freely changed, provided only that the exposed surface 20M has the shape of about the inverted trapezoid having the above-mentioned structural characteristics.

Figure 10:
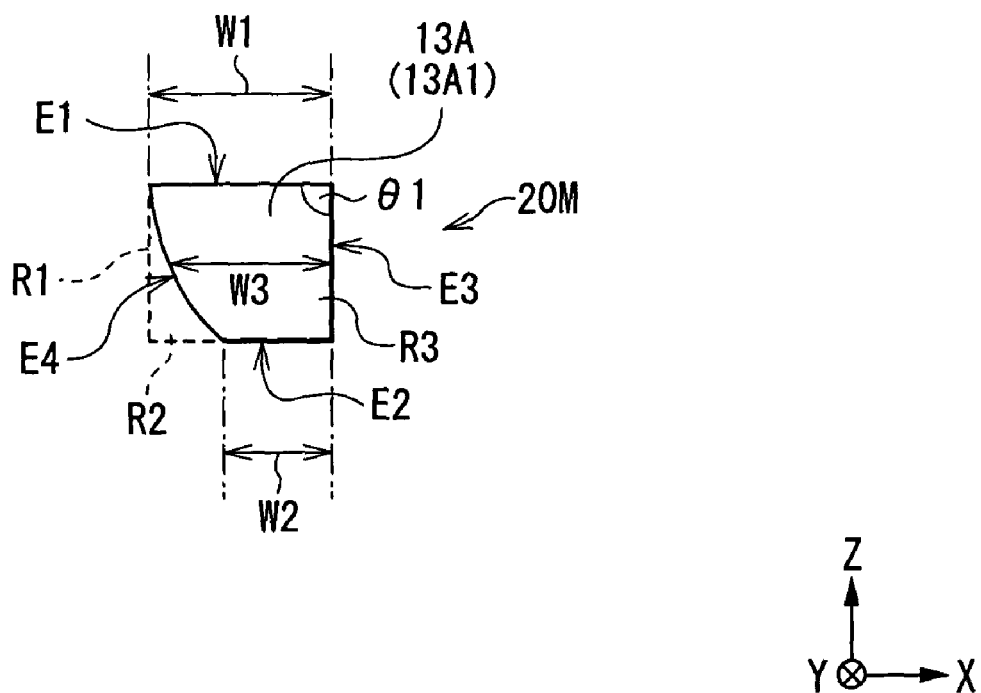
FIG. 10 is a plan view of a modification of the configuration of the exposed surface of the magnetic pole portion layer.
Figure 11:
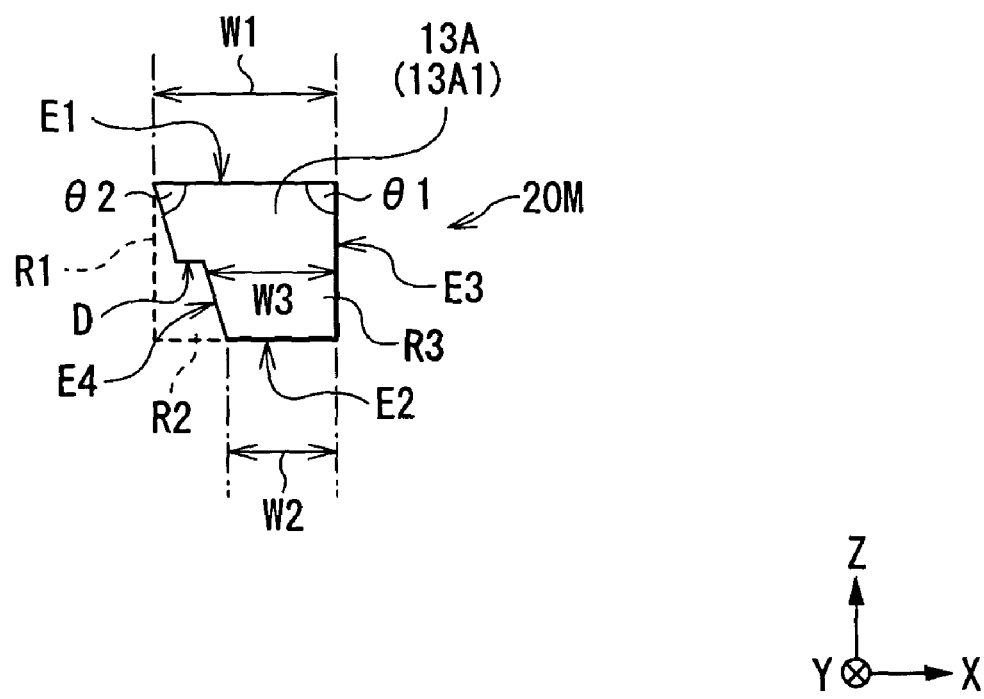
FIG. 11 is a plan view of another modification of the configuration of the exposed surface of the magnetic pole portion layer.

Specific examples of the configuration of the exposed surface 20M are as follows. As shown in FIG. 10, the exposed surface 20M may be configured in such a manner that the side edge E4 has the form of a convexly curved line. More specifically, the exposed surface 20M may be configured to have a shape which is formed by removing from the rectangular region R1 the width increasing region R2 whose width increases gradually along the curved line. Alternatively, as shown in FIG. 11, the exposed surface 20M may be configured in such a manner that the side edge E4 is cranked and has a step portion D midway along the edge E4. More specifically, the exposed surface 20M may be configured to have a shape which is formed by removing from the rectangular region R1 the width increasing region R2 whose width increases stepwise at a position corresponding to the step portion D. The exposed surface 20M having either of the shapes shown in FIGS. 10 and 11 allows both ensuring the overwrite characteristics and preventing the adverse effect resulting from side erase, because of having the same function as the exposed surface 20M having the shape shown in FIG. 3. Although the exposed surface 20M shown in FIG. 10 is configured in such a manner that the side edge E4 is convexly curved, the exposed surface 20M is not necessarily limited to this configuration but may be configured in such a manner that the side edge E4 is concavely curved. It should be noted that the overwrite characteristics may deteriorate due to a decrease in the area of the exposed surface 20M because the exposed surface 20M having the side edge E4 concavely curved has a smaller area, as compared to the exposed surface 20M having the side edge E4 convexly curved.

Figure 12C:
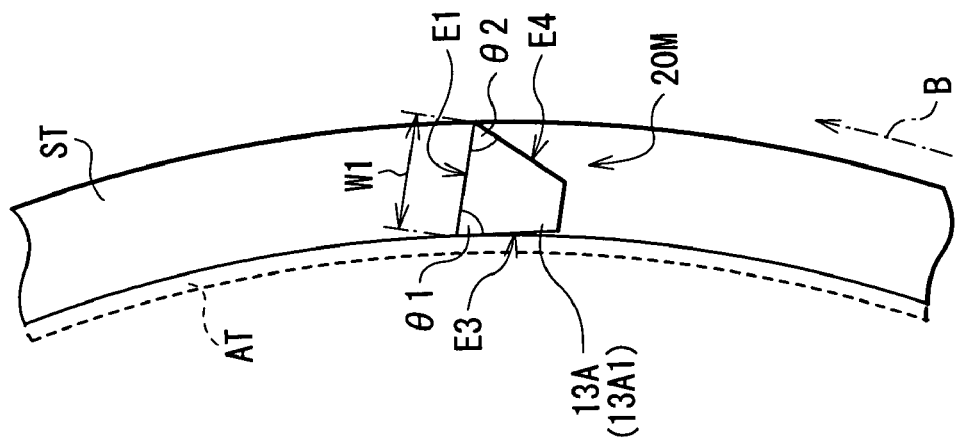
FIGS. 12A to 12C are plan views of still another modification of the configuration of the exposed surface of the magnetic pole portion layer.
Figure 12B:
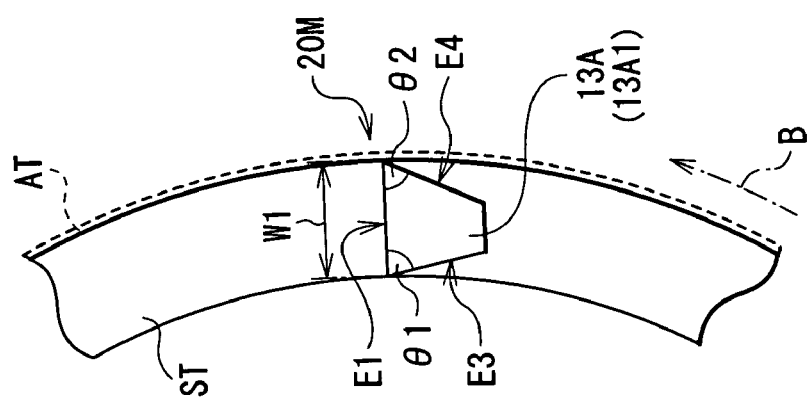
Figure 12A:
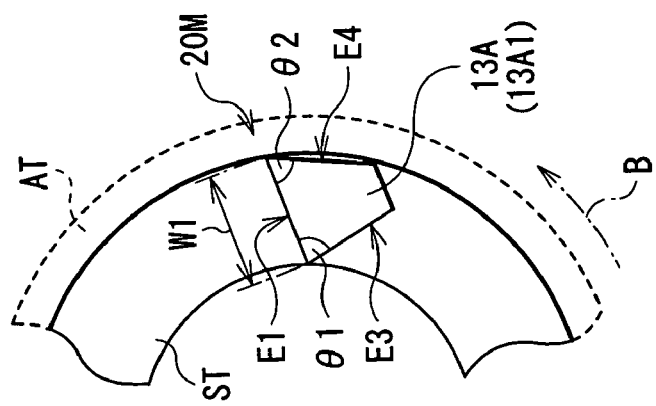

The exposed surface 20M may be configured, for example in such a manner that both the angles θ1 and θ2 are acute angles, provided that the angles θ1 and θ2 are different from each other. For example when the angles θ1 and θ2 are adjusted so that the side edge E3 does not extend to the adjacent track AT at the position P3 as shown in FIGS. 12A to 12C, this configuration makes it possible to satisfactorily prevent the adverse effect resulting from side erase even at the position P3, as distinct from the above-described embodiment (see FIGS. 9A to 9C).

Next, the description is given with reference to FIGS. 1A to 3 and FIGS. 13 to 20 with regard to a method of manufacturing the thin film magnetic head according to the embodiment. FIGS. 13 to 16 illustrate, in cross-sectional view, the configuration of the thin film magnetic head in the steps of manufacturing the thin film magnetic head. FIGS. 17 to 20 illustrate, in perspective view, the configuration of the thin film magnetic head, corresponding to the steps shown in FIGS. 13 to 16, respectively.

Hereinafter, the brief description is first given with regard to the general method of manufacturing the thin film magnetic head, and then the detailed description is given with regard to a method of forming the magnetic pole portion layer 13A to which the method of manufacturing the thin film magnetic head of the invention is applied. Since the detailed description has been previously given with regard to the materials, thicknesses and structural characteristics of structural components of the thin film magnetic head, the description thereof is appropriately omitted hereinbelow.

The thin film magnetic head is manufactured mainly by stacking a series of structural components in sequence by the use of, for example, a thin film process, a polishing process, and the like. More specifically, first, the insulating layer 2 is formed on the substrate 1, and then the reproducing head part 100A is formed by forming the bottom shield layer 3, the shield gap film 4 having the MR element 5 embedded therein, and the top shield layer 7, which are stacked in this sequence on the insulating layer 2.

Then, the nonmagnetic layer 8 is formed on the reproducing head part 100A, and then the recording head part 100B is formed by forming the auxiliary magnetic pole layer 9, the gap layer 10 (the gap layer portions 10A, 10B and 10C) having the thin film coil 11 embedded therein, the coupling portion 12 with which the opening 10CK of the gap layer 10 is filled, and the main magnetic pole layer 13 having the buffer layer 14 partly sandwiched in, which are stacked in this sequence on the nonmagnetic layer 8.

Finally, the overcoat layer 15 is formed on the recording head part 100B, and thus the thin film magnetic head is completed. In actual manufacturing steps, the above-mentioned structural components of the thin film magnetic head are completed by forming the air bearing surface 20 by means of, for instance, machining and polishing.

Figure 13:
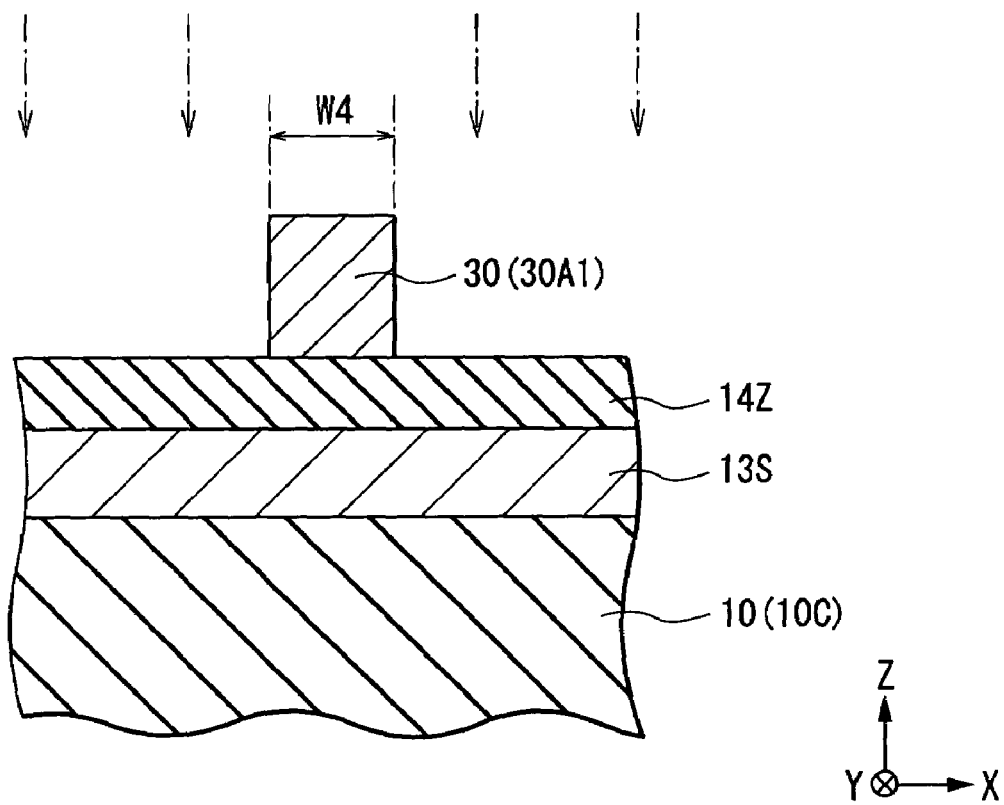
FIG. 13 is a cross-sectional view of assistance in explaining one of the steps of manufacturing the thin film magnetic head according to the embodiment of the invention.
Figure 17:
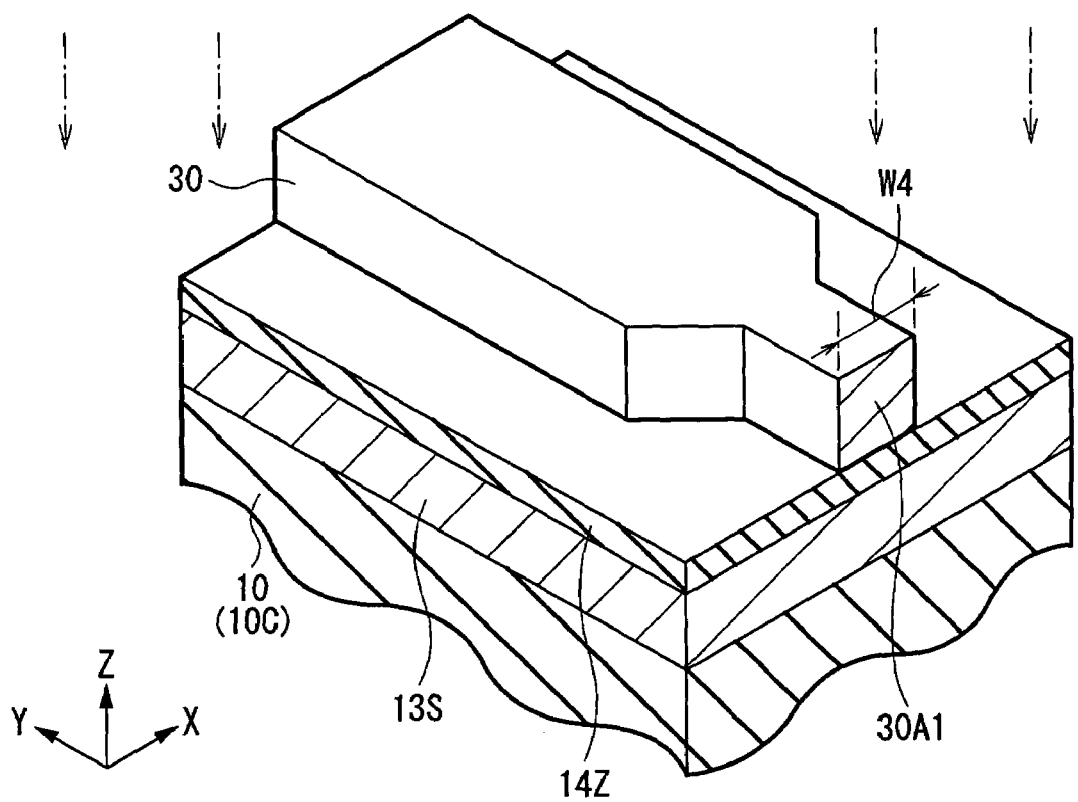
FIG. 17 is a perspective view of the configuration shown in the cross-sectional view of FIG. 13.

The magnetic pole portion layer 13A is formed in the following manner. First, as shown in FIGS. 13 and 17, the gap layer portion 10C constituting a part of the gap layer 10 is formed, and then a base magnetic pole layer 13S is formed with a thickness of about 0.1 μm to 1.0 μm on the gap layer portion 10C by employing, for example, sputtering using the material used for the magnetic pole portion layer 13A. As employed herein, the gap layer 10 corresponds to a specific example of "an underlayer" of the invention.

Then, as shown in FIGS. 13 and 17, a precursory buffer layer 14Z is formed with a thickness of about 0.1 μm to 1.0 μm on the base magnetic pole layer 13S by employing, for example, sputtering using the material used for the buffer layer 14, more specifically the material having a lower etching rate than the material of the base magnetic pole layer 13S.

Then, as shown in FIGS. 13 and 17, a mask layer 30 is formed with a thickness of about 0.1 μm to 3.0 μm on the precursory buffer layer 14Z by growing a plated film made of Permalloy or the like on the layer 14Z by the use of, for example, flame plating. The mask layer 30 is formed in such a manner that the mask layer 30 is positioned so as to have a shape in plan view corresponding to the magnetic pole portion layer 13A to be finally formed (see FIGS. 16 and 20) and that the mask layer 30 includes a portion 30A1 (of a width W4) corresponding to, in particular, the front end portion 13A1 of the magnetic pole portion layer 13A (incidentally, the portion 30A1 is hereinafter referred to as "a corresponding portion").

Figure 14:
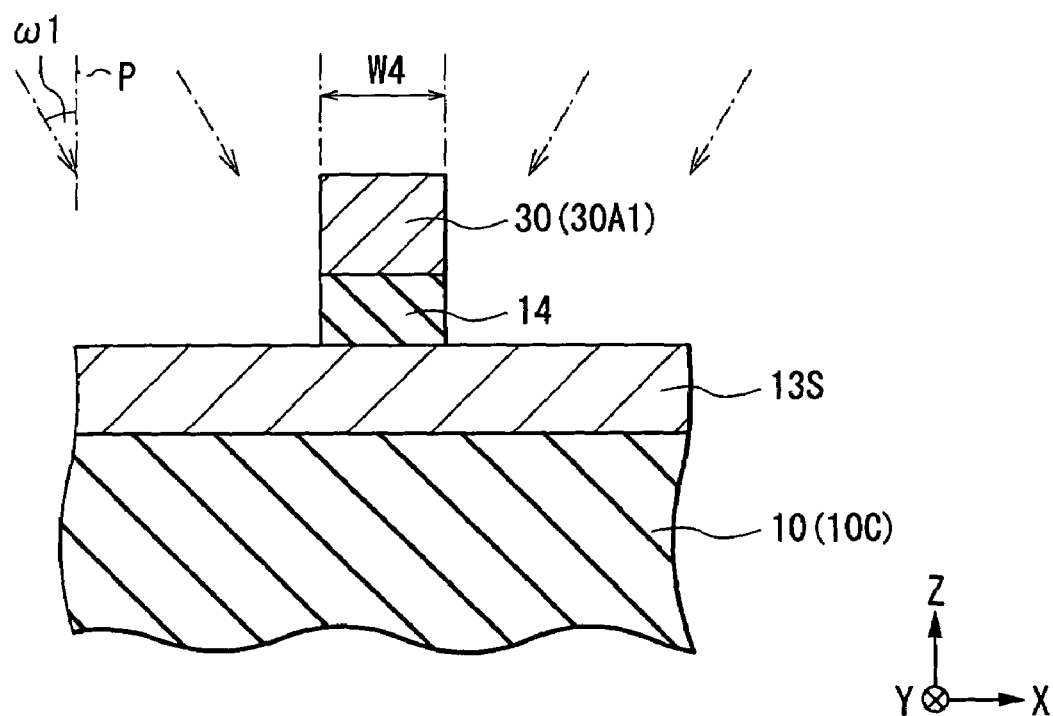
FIG. 14 is a cross-sectional view of assistance in explaining a step following the step of FIG. 13.
Figure 18:
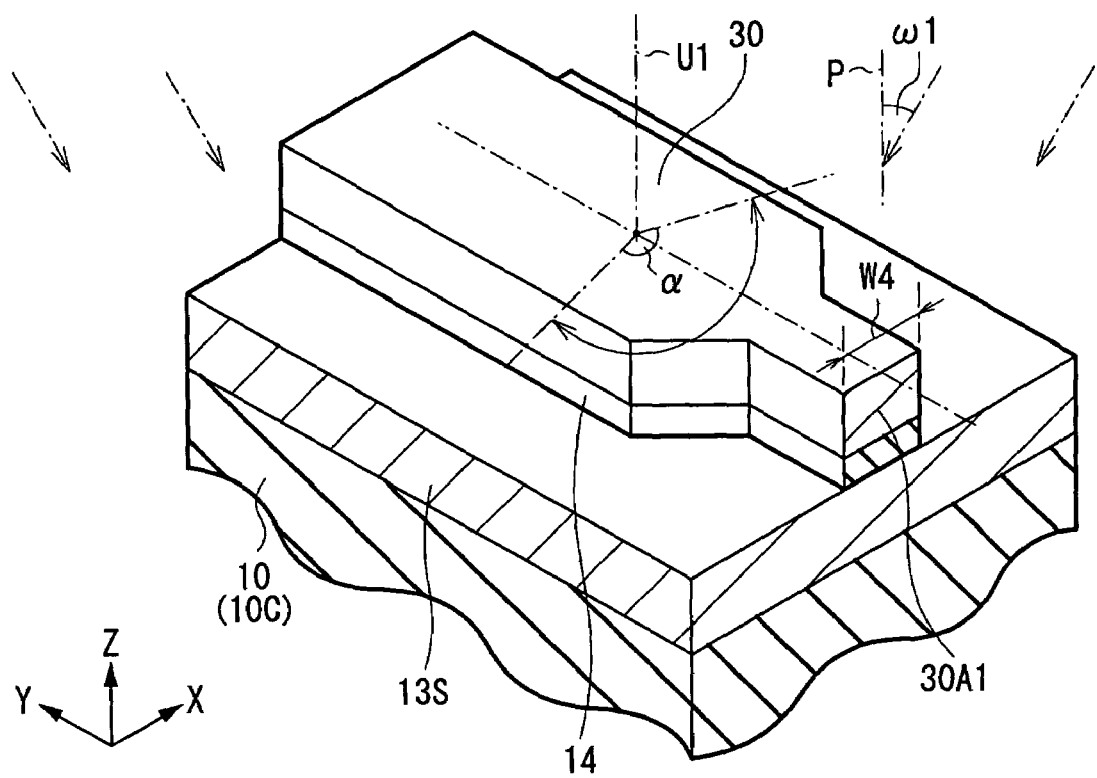
FIG. 18 is a perspective view of the configuration shown in the cross-sectional view of FIG. 14.

Then, for instance, as shown in FIGS. 13 and 17, the precursory buffer layer 14Z is subjected to an etching process by employing, for example, reactive ion etching (RIE) using the mask layer 30. By this etching process, the precursory buffer layer 14Z is etched mainly in a vertically downward direction with the mask layer 30 in between, and thus the buffer layer 14 is formed so as to have substantially the same shape in plan view as the mask layer 30 as shown in FIGS. 14 and 18. During etching, the mask layer 30 decreases in thickness due to the action of etching along the height, for example.

Figure 15:
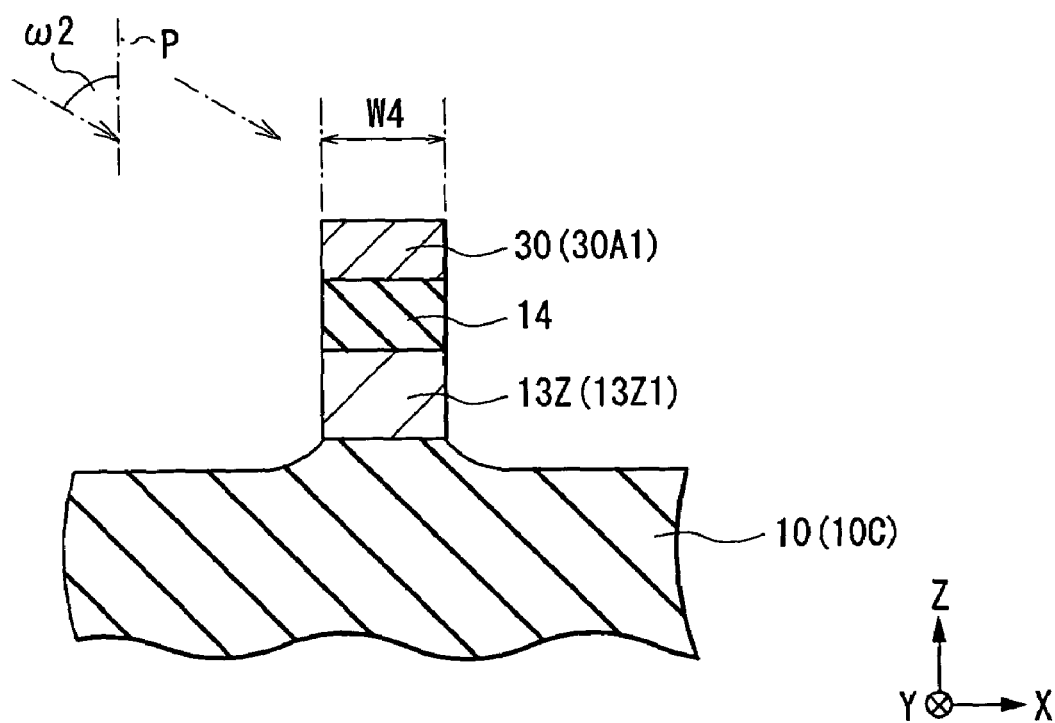
FIG. 15 is a cross-sectional view of assistance in explaining a step following the step of FIG. 14.
Figure 19:
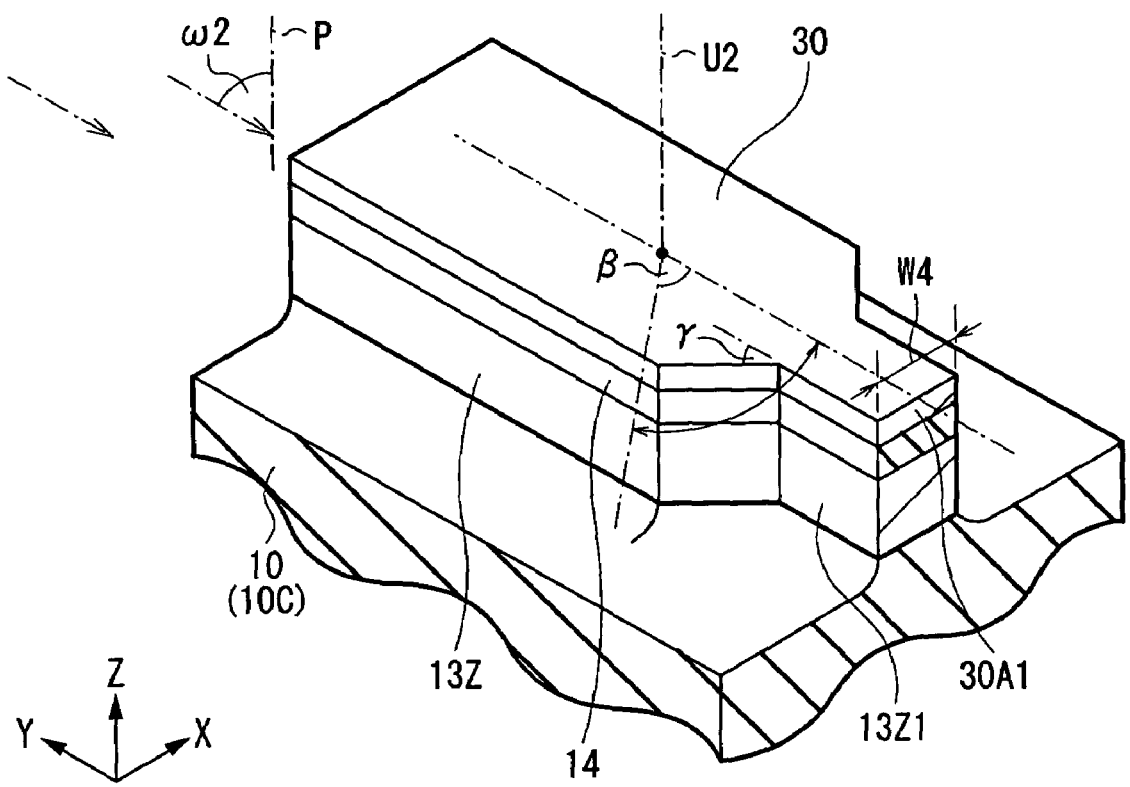
FIG. 19 is a perspective view of the configuration shown in the cross-sectional view of FIG. 15.

Then, for instance, as shown in FIGS. 14 and 18, the base magnetic pole layer 13S is subjected to an etching process, using the buffer layer 14 as a mask, by irradiation with ion beams at an angle ω1 (i.e., an angle of irradiation) of about 37.5 degrees plus or minus 7.5 degrees relative to a perpendicular line P to an extending surface of the base magnetic pole layer 13S. For this etching process, for example, the whole stack is rocked across the width at a rocking angle α of approximately 180 degrees plus or minus 30 degrees about the axis of rocking which coincides with a center line U1 of the base magnetic pole layer 13S parallel to the perpendicular line P, as shown in FIG. 18. During the etching process, the whole stack, however, does not necessarily require rocking but may undergo rotation, for instance. The base magnetic pole layer 13S undergoes patterning through the etching process, and thus a precursory magnetic pole layer 13Z is selectively formed so as to have substantially the same shape in plan view as the mask layer 30 as shown in FIGS. 15 and 19. The precursory magnetic pole layer 13Z is a preparatory layer which is to be etched and thus formed into the magnetic pole portion layer 13A in the following step, and the layer 13Z is formed so as to include a corresponding portion 13Z1 having the uniform width W4. During etching, the gap layer portion 10C is partly etched away by the action of etching along the height, for example. As employed herein, the corresponding portion 13Z1 constituting a part of the precursory magnetic pole layer 13Z corresponds to a specific example of "a uniform width portion" of the invention.

Finally, for instance, as shown in FIGS. 15 and 19, the precursory magnetic pole layer 13Z is subjected to an etching process by irradiation with ion beams at an angle ω2 of irradiation of about 60 degrees plus or minus 10 degrees on one side along the width (e.g., on the left side in FIGS. 15 and 19), using the buffer layer 14 as the mask in the same manner as the preceding step. For this etching process, for example, the precursory magnetic pole layer 13Z is rocked about the axis of rocking coinciding with a center line U2 so that the corresponding portion 13Z1 of the precursory magnetic pole layer 13Z is locally etched on the left side surface, as shown in FIG. 19. In this case, a rocking angle β can be set in accordance with, for example, a flare angle γ of the precursory magnetic pole layer 13Z, that is, an angle of expansion of the width of the precursory magnetic pole layer 13Z. The rocking angle β is set to about 135 degrees plus or minus 5 degrees when the flare angle γ is approximately equal to 45 degrees, or the rocking angle β is set to about 120 degrees plus or minus 5 degrees when the flare angle γ is approximately equal to 60 degrees. In the etching process, the corresponding portion 13Z1 is additionally etched on the left side mainly by the action of etching along the width, and in this case, the portion 13Z1 is more etched in its lower portion than in its upper portion. By the etching process, the width of an upper edge of the corresponding portion 13Z1 is reduced from the width W4 to the width W1 smaller than the width W4 (W1<W4), and the width of a lower edge of the portion 13Z1 is also reduced from the width W4 to the width W2 still smaller than the above-mentioned width W1 (W2<W1<W4).

Figure 16:
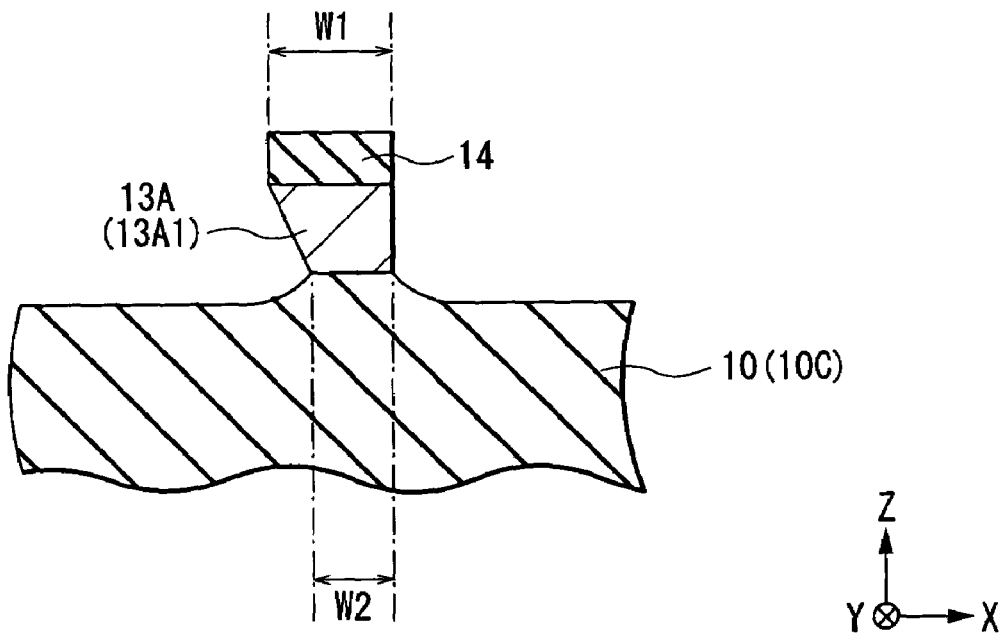
FIG. 16 is a cross-sectional view of assistance in explaining a step following the step of FIG. 15.
Figure 20:
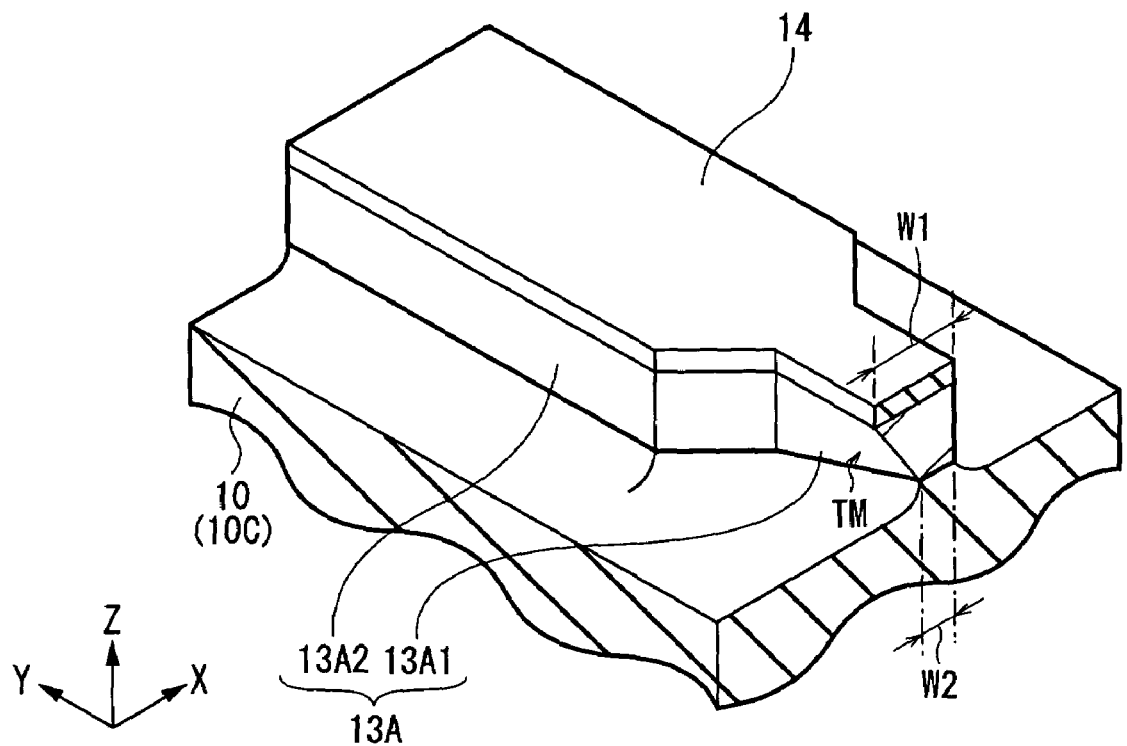
FIG. 20 is a perspective view of the configuration shown in the cross-sectional view of FIG. 16.

By the above-described etching process, the magnetic pole portion layer 13A is selectively formed so as to include the front end portion 13A1 having the tapered surface TM on one side (e.g., on the left side) and having the cross section in the shape of the asymmetric inverted trapezoid, and the rear end portion 13A2 coupled to the portion 13A1, as shown in FIGS. 16 and 20. To form the magnetic pole portion layer 13A, for example, the corresponding portion 13Z1 is etched by about 0.05 μm to 0.2 μm near and on the upper edge thereof on the left side so that the angle θ1 is equal to 90 degrees and the angle θ2 between the side edge E4 and the upper edge E1 lies between about 81 and 83 degrees inclusive, as shown in FIG. 3. During etching, even the mask layer 30 is etched and thus decreases in thickness. In FIGS. 16 and 20, there is shown, for example, the buffer layer 14 which is etched and thus has a reduced thickness after the mask layer 30 has decreased in thickness and then gone out of existence through the etching process.

In more detail, the magnetic pole portion layer 13A is completed through the process which follows the etching process for forming the tapered surface TM and involves forming the air bearing surface 20 by polishing the end surface of the stacked structure including the precursory magnetic pole layer 13Z, thus forming the exposed surface 20M incident to the formed air bearing surface 20.

The method of manufacturing the thin film magnetic head according to the embodiment includes forming the buffer layer 14 on the precursory magnetic pole layer 13Z, and then selectively etching the precursory magnetic pole layer 13Z on one side surface thereof by irradiation with the ion beams diagonally from above, using the buffer layer 14 as the mask.

Thus, when the corresponding portion 13Z1 of the precursory magnetic pole layer 13Z is locally etched on one side surface, the action of etching along the width has priority over the action of etching along the height, and moreover, the buffer layer 14 functions as an anti-etching layer for preventing the corresponding portion 13Z1 from being etched near and on the upper edge thereof. Thus, the corresponding portion 13Z1 is more etched near and on its lower edge than near and on its upper edge. More specifically, as described above, this etching process reduces the width of the upper edge of the corresponding portion 13Z1 from the width W4 to the width W1 smaller than the width W4 (W1<W4), and also reduces the width of the lower edge thereof from the width W4 to the width W2 still smaller than the above-mentioned width W1 (W2<W1<W4). Thus, the magnetic pole portion layer 13A is formed in such a manner that the front end portion 13A1 has the tapered surface TM on one side and the exposed surface 20M of the portion 13A1 is characteristically configured to have the shape of the asymmetric inverted trapezoid shown in FIG. 3. Furthermore, the embodiment requires only the use of the existing thin film process having high manufacturability, rather than the use of manufacturing technology having low manufacturability, such as FIB process, in order to form the magnetic pole portion layer 13A having the exposed surface 20M having the characteristic configuration. Therefore, the embodiment makes it possible to manufacture, with high manufacturability, the thin film magnetic head including the magnetic pole portion layer 13A having the exposed surface 20M having the shape of the asymmetric inverted trapezoid.

The embodiment can also improve manufacturing yield of the thin film magnetic head, particularly in that the exposed surface 20M of the magnetic pole portion layer 13A has the shape of the asymmetric inverted trapezoid, and thus the embodiment contributes to improved manufacturability also in this aspect. The reason is as follows.

More specifically, it is possible that the thin film magnetic head of the second comparative example having the exposed surface 220M shown in FIG. 5 is used, for example when importance is attached to the prevention of the adverse effect resulting from side erase without any consideration of the deterioration in the overwrite characteristics. However, a problem exists in this case. More specifically, when the width W2 of the lower edge E2 becomes too narrow due to the smaller angles θ1 and θ2, a portion DS of the front end portion 213A1 near and on the lower edge E2 becomes thinner and sharper and thus decreases in physical strength, and thus the portion DS near and on the lower edge E2 may become chipped due to the influence of vibration generated during the manufacturing process, the etching process, or the like. The magnetic pole portion layer 213A having the chipped portion DS near and on the lower edge E2 is regarded as defective, and therefore this leads to reduction in the yield of the thin film magnetic head. Another problem exists. More specifically, although achievement of recording density in excess of, for example, 100 gigabits per square inch requires minimization of the width W1 of the upper edge E1 while ensuring that the front end portion 213A1 has such a thickness that overwriting is possible (e.g., a thickness of at least about 0.15 nm to 0.25 nm), it becomes difficult to control the angles θ1 and θ2 when the upper edge E1 has the minimized width W1, and therefore this may also cause the reduction in the yield. On the other hand, in the embodiment, the angle θ2 is smaller because the angle θ1 is the right angle as shown in FIG. 3, and moreover, the width W2 of the lower edge E2 of the exposed surface 20M of the embodiment is greater than that of the second comparative example even if the upper edge E1 has the minimized width W1. This allows ensuring the physical strength of the portion DS near and on the lower edge E2, thus reducing the likelihood of the portion DS chipping. Therefore, the embodiment allows reducing the probability of defects appearing in the magnetic pole portion layer 13A, thus improving the manufacturing yield of the thin film magnetic head.

Figure 21:
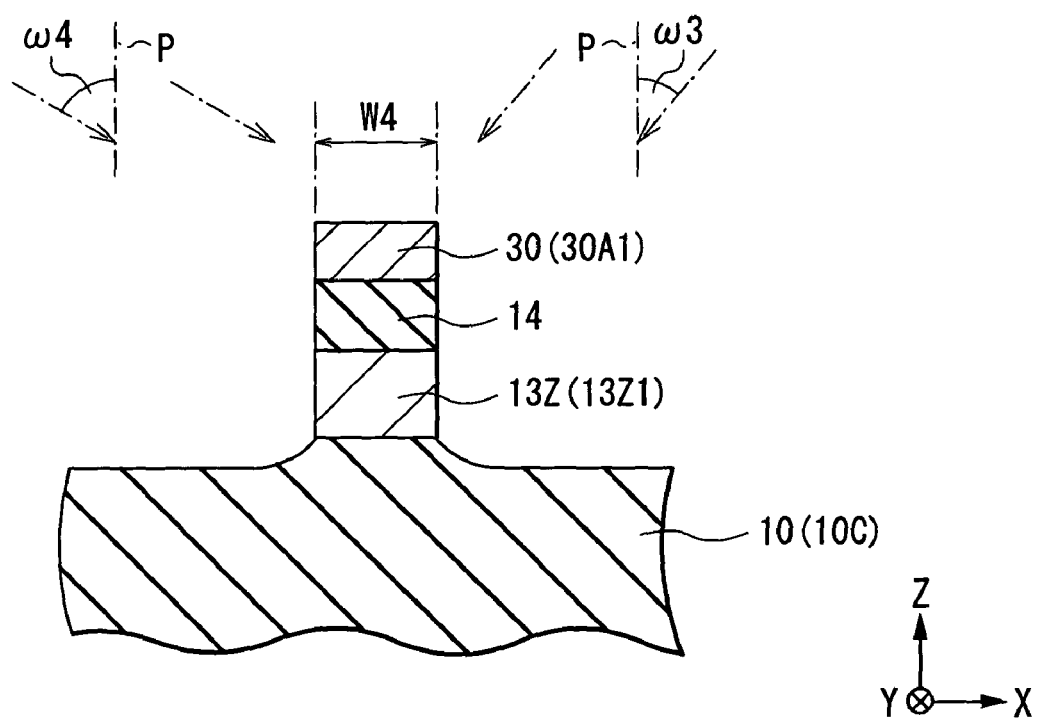
FIG. 21 is a cross-sectional view of assistance in explaining a modification of a method of forming the magnetic pole portion layer.

In the embodiment, the precursory magnetic pole layer 13Z is etched by irradiation with the ion beams on one side along the width as shown in FIGS. 15 and 19 so that the angle $\theta 1$ of the exposed surface 20M is the right angle and the angle $\theta 2$ thereof is the acute angle as shown in FIG. 3. However, the invention is not necessarily limited to this embodiment. For example, when the precursory magnetic pole layer 13Z is etched on both sides along the width at different etching angles (i.e., angles $\omega 3$ and $\omega 4$ of irradiation with ion beams) as shown in FIG. 21, the exposed surface 20M can be formed in such a manner that both the angles $\theta 1$ and $\theta 2$ are acute angles as shown in FIGS. 12A to 12C. The relation between the angles $\theta 3$ and $\theta 4$ of irradiation and the angles $\theta 1$ and $\theta 2$ is as follows. For example, when the buffer layer 14 is made of alumina and the precursory magnetic pole layer 13Z is made of an iron-cobalt alloy, the angles $\omega 3$ of irradiation of 50, 60 and 70 degrees lead to the angles $\theta 1$ which lie between 84 and 87 degrees, between 79 and 82 degrees, and between 74 and 77 degrees, respectively, and the angles $\omega 4$ of irradiation of 50, 60 and 70 degrees lead to the angles $\theta 2$ which lie between 84 and 87 degrees, between 79 and 82 degrees, and between 74 and 77 degrees, respectively. More specifically, for example, when the angles $\omega 3$ and $\omega 4$ of irradiation are equal to 50 degrees and 70 degrees, respectively, the angles $\theta 1$ and $\theta 2$ are approximately equal to 86 degrees and 76 degrees, respectively.

EXAMPLES

The following results are obtained by examining recording characteristics of the thin film magnetic head according to the embodiment.

Figures 22A, 22B:
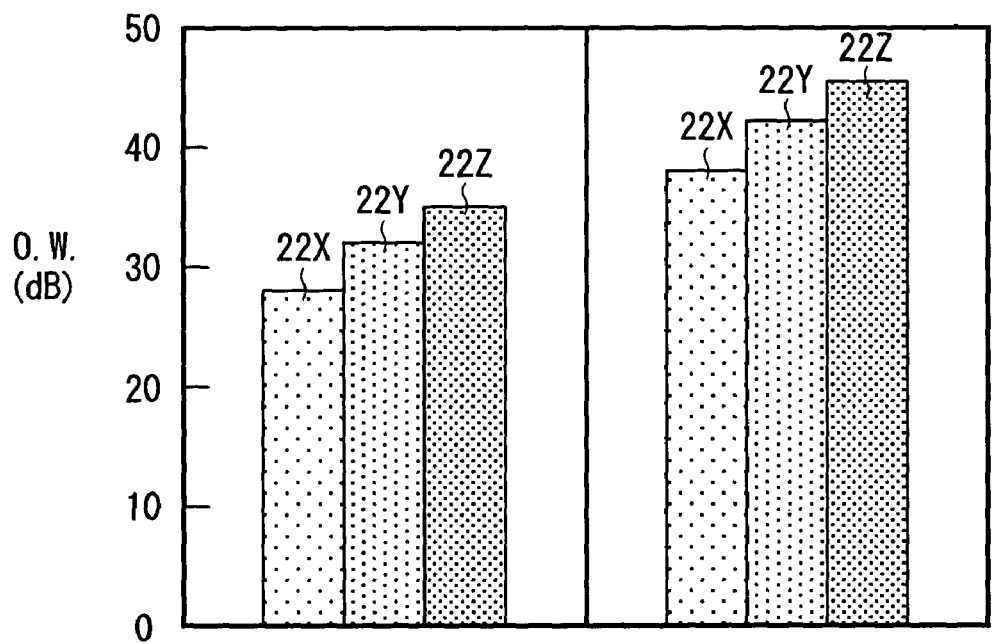
FIGS. 22A and 22B are graphs showing the results of experiments on the overwrite characteristics of the thin film magnetic heads of the embodiment and the first and second comparative examples.

Firstly, the results shown in FIGS. 22A and 22B are obtained by examining the overwrite characteristics of the thin film magnetic head. FIGS. 22A and 22B show the results of experiments on the overwrite characteristics of the thin film magnetic heads of the embodiment and the first and second comparative examples. In FIGS. 22A and 22B, "the vertical axis" indicates overwrite O.W. (dB). FIG. 22A shows the results which are obtained when information recorded at low density is overwritten with information recorded at high density, and FIG. 22B shows the results which are obtained when information recorded at high density is overwritten with information recorded at low density. In FIGS. 22A and 22B, the reference characters 22X, 22Y and 22Z represent the overwrite characteristic values of the second comparative example (see FIG. 5), the embodiment (see FIG. 3), and the first comparative example (see FIG. 4), respectively.

As can be seen from the results shown in FIGS. 22A and 22B, the overwrite characteristic values (22X, 22Y and 22Z) of the second comparative example, the embodiment, and the first comparative example are equal to 28.1 dB, 31.5 dB, and 34.8 dB, respectively, when the information recorded at low density is overwritten with the information recorded at high density (see FIG. 22A). On the other hand, the overwrite characteristic values (22X, 22Y and 22Z) of the second comparative example, the embodiment, and the first comparative example are equal to 38.2 dB, 42.5 dB, and 45.9 dB, respectively, when the information recorded at high density is overwritten with the information recorded at low density (see FIG. 22B). In other words, under either of conditions shown in FIGS. 22A and 22B, the increasing order of the overwrite characteristic value, from lowest to highest, is the second comparative example, the embodiment, and the first comparative example. It is clear from the results that the thin film magnetic head according to the embodiment achieves proper overwrite characteristics equivalent to intermediate overwrite characteristics between the overwrite characteristics of the first and second comparative examples.

Then, the results shown in FIGS. 23A to 23C are obtained by examining the state of occurrence of side erase. FIGS. 23A to 23C show the results of experiments on the state of occurrence of side erase which arises when each of the thin film magnetic heads of the embodiment and the first and second comparative examples is mounted on the hard disk drive shown in FIG. 6. In FIGS. 23A to 23C, "the vertical axis" indicates adjacent track erase ATE (%). The adjacent track erase refers to the percentage of information, which has been previously recorded on an adjacent track, remaining on the adjacent track. The occurrence of no side erase is equivalent to 100%. FIGS. 23A, 23B and 23C correspond to the positions P1, P2 and P3 on the hard disk 300 shown in FIG. 6, respectively. In FIGS. 23A to 23C, the reference characters 23X, 23Y and 23Z represent the adjacent track erase values of the second comparative example (see FIG. 5), the embodiment (see FIG. 3), and the first comparative example (see FIG. 4), respectively.

As can be seen from the results shown in FIGS. 23A to 23C, the adjacent track erase values (23X, 23Y and 23Z) of the second comparative example, the embodiment, and the first comparative example are equal to 94.48%, 93%, and 88.50%, respectively, at the position P1 (see FIG. 23A). The adjacent track erase values (23X, 23Y and 23Z) are equal to 95.63%, 95%, and 96.86%, respectively, at the position P2 (see FIG. 23B). The adjacent track erase values (23X, 23Y and 23Z) are equal to 97.96%, 96%, and 96.49%, respectively, at the position P3 (see FIG. 23C). In other words, at the positions P2 and P3, the adjacent track erase values exceed 90% when any of the thin film magnetic heads is used, and thus the state of occurrence of side erase is within permissible limits for normal recording operation. At the position P1, the adjacent track erase value of the first comparative example, however, is less than 90%, although the adjacent track erase values of the second comparative example and the embodiment are more than 90%. It is clear from the results that the thin film magnetic head according to the embodiment properly prevents the adverse effect resulting from side erase at all the positions P1 to P3 on the hard disk 300, similarly to the second comparative example.

Although the invention has been described above by referring to the embodiment, the invention is not limited to the above-mentioned embodiment and various modifications of the invention are possible. More specifically, the details about the configuration of the thin film magnetic head and the method of manufacturing the thin film magnetic head, as exemplified by the above-mentioned embodiment, are not necessarily limited to those mentioned in the description of the above-mentioned embodiment. The configuration or the like may be freely changed, provided only that the exposed surface 20M is adapted to enable both ensuring the overwrite characteristics and preventing the adverse effect resulting from side erase: more specifically, the exposed surface 20M of the front end portion 13A1 constituting a part of the magnetic pole portion layer 13A is configured to have the shape corresponding to the remaining region R3 which remains after removing the width increasing region R2, R2 increasing its width from the medium outflow side to the medium inflow side from the rectangular region R1 on one side. Incidentally 'one side' is determined according to the state of occurrence of side erase, along the width.

Figure 24:
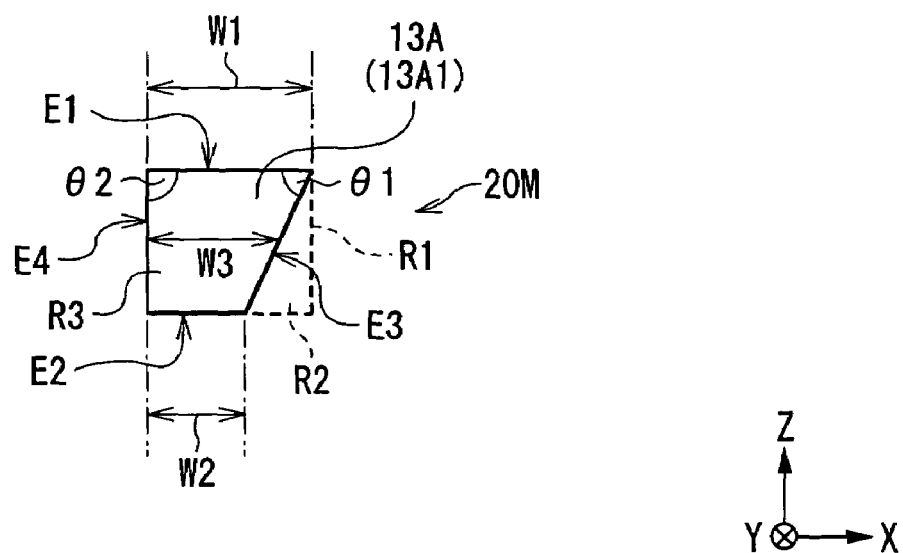
FIG. 24 is a plan view of a further modification of the configuration of the exposed surface of the magnetic pole portion layer.

In the above-mentioned embodiment, the exposed surface 20M of the magnetic pole portion layer 13A is configured to have the shape of the asymmetric inverted trapezoid which is formed by removing the width increasing region R2 from the rectangular region R1 on the side of the side edge E4, as shown in FIG. 3. However, the configuration of the exposed surface 20M is not necessarily limited to this configuration. As described above, the side of the rectangular region R1 from which the width increasing region R2 is removed may be changed according to the state of occurrence of side erase. Specifically, as shown in FIG. 24, the exposed surface 20M may be configured to have the shape of the asymmetric inverted trapezoid which is formed by removing the width increasing region R2 from the rectangular region R1 on the side of the side edge E3, more specifically on the far side with respect to the center point of the hard disk 300 in the radial direction thereof when the main magnetic pole layer 13 is faced with the hard disk 300. The description is given below with regard to the reason why the exposed surface 20M configured as shown in FIG. 24 can obtain the same advantage as the exposed surface 20M of the above-mentioned embodiment, discussing mainly the aspect of the prevention of the adverse effect resulting from side erase.

Figure 25:
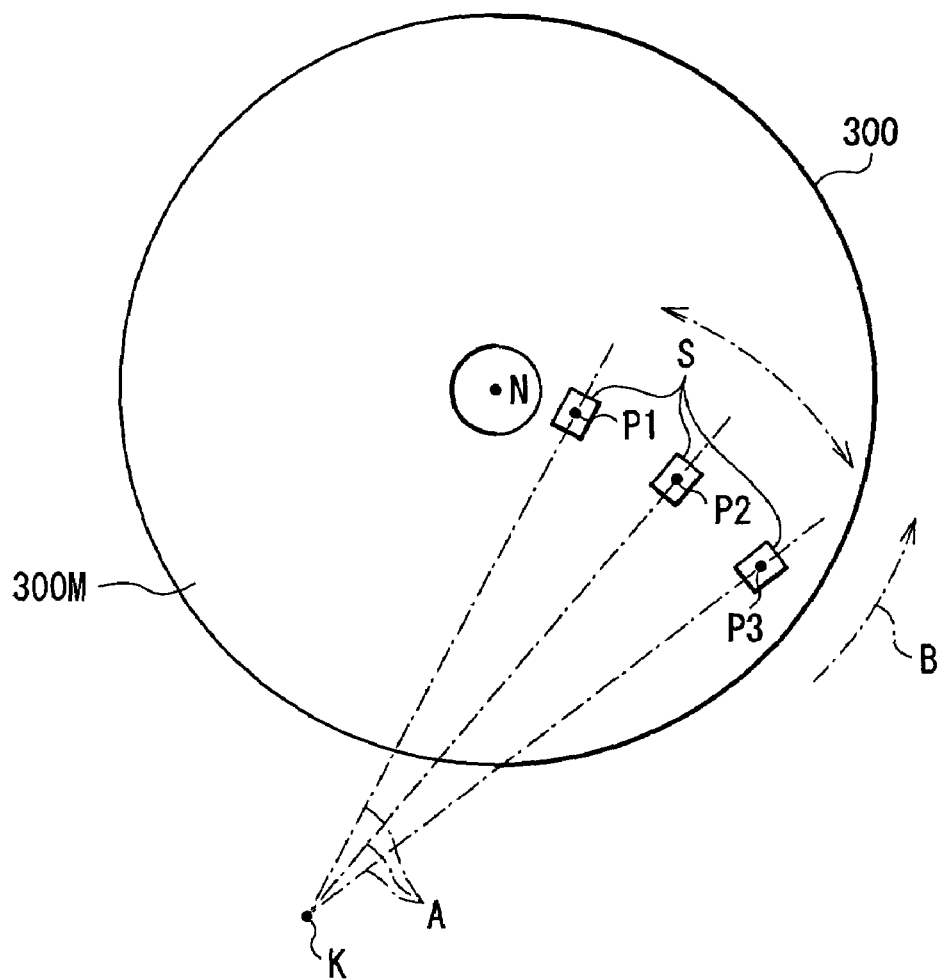
FIG. 25 is a schematic plan view of the configuration of another hard disk drive on which the thin film magnetic head is mounted.

FIG. 25 shows a schematic representation of the configuration of another hard disk drive on which each of the thin film magnetic heads of the embodiment and the first and second comparative examples is mounted. FIG. 25 corresponds to FIG. 6. FIGS. 26A to 28C are illustrations of assistance in explaining the state of occurrence of side erase which arises when each thin film magnetic head is mounted on the hard disk drive shown in FIG. 25. FIGS. 26A to 28C correspond to FIGS. 7A to 9C, respectively.

When the guide pivot K is located at a different position from the position shown in FIG. 6 as shown in FIG. 25, the state of occurrence of side erase changes depending on the position of the guide pivot K as shown in FIGS. 26A to 28C, as compared to the states mentioned in the description of the above-mentioned embodiment (see FIGS. 7A to 9C).

Figure 26C:
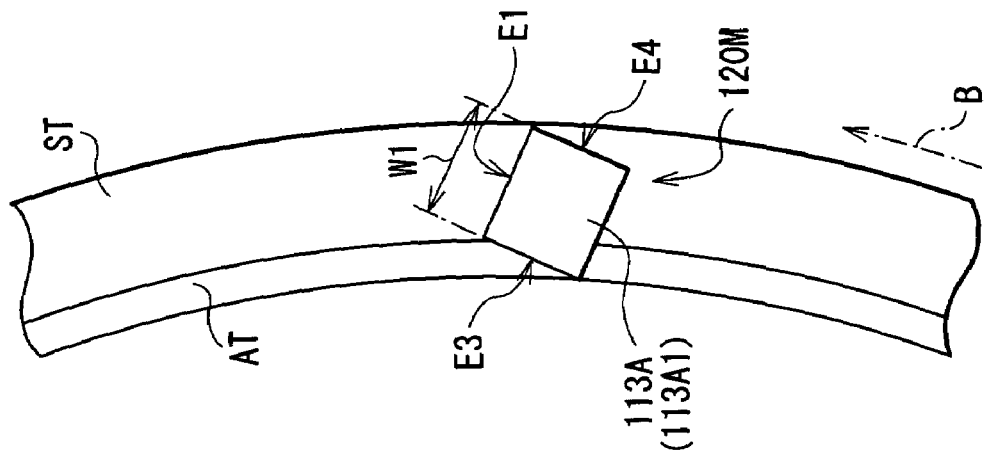
FIGS. 26A to 26C are plan views of assistance in explaining the state of occurrence of side erase which arises when the thin film magnetic head of the first comparative example is mounted on the hard disk drive shown in FIG. 25.
Figure 26B:
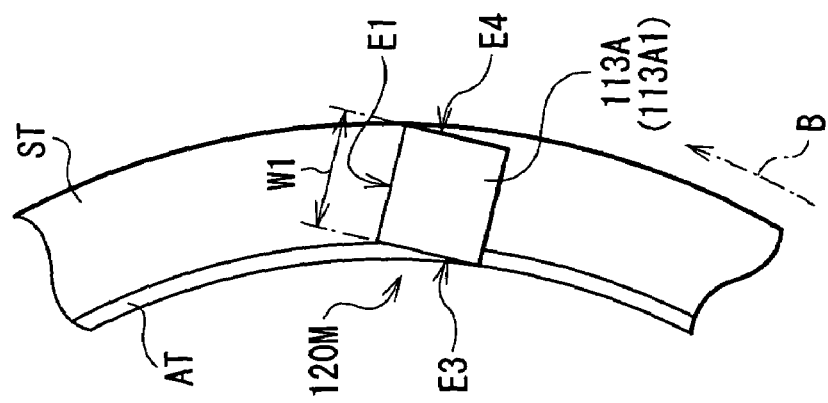
Figure 26A:
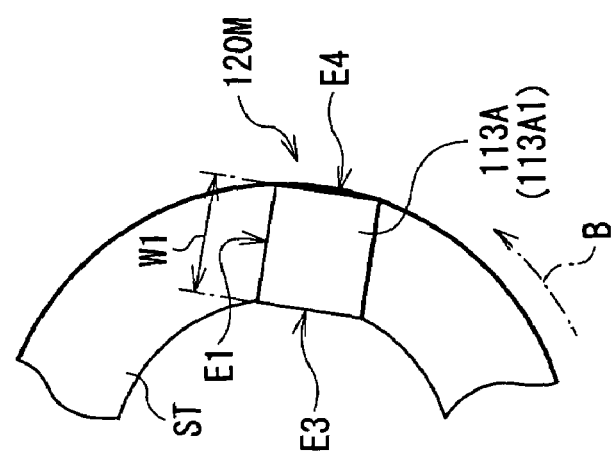

The first comparative example (see FIGS. 26A to 26C) causes a greater adverse effect resulting from side erase for the following reason: at the positions P2 and P3, the exposed surface 120M extends to the adjacent track AT located inward relative to the target track ST, even if the guide pivot K is positioned so that the exposed surface 120M does not extend to the adjacent track at the position P1 during the occurrence of skew, as shown in FIG. 26A, for example. More specifically, at the position P2, the exposed surface 120M is skewed in the outward direction as shown in FIG. 26B, for example. Due to this skew, overwriting is unintentionally performed on the adjacent track AT by the side edge E3 extending off the target track ST in the inward direction. At the position P3, the exposed surface 120M is more greatly skewed in the outward direction as shown in FIG. 26C, for example. Due to this skew, overwriting is performed over a wider range of the adjacent track AT by the side edge E3. Therefore, the recording processing using the thin film magnetic head of the first comparative example is more likely to interfere with normal recording operation, because of causing a marked increase in the range of overwriting on the adjacent track AT, in particular at the position P3 at which the target track ST has the largest curvature radius.

Figure 27C:
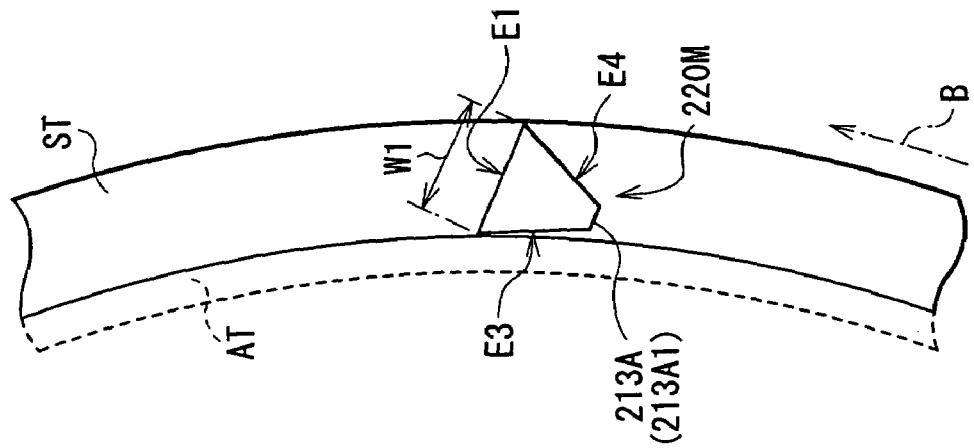
FIGS. 27A to 27C are plan views of assistance in explaining the state of occurrence of side erase which arises when the thin film magnetic head of the second comparative example is mounted on the hard disk drive shown in FIG. 25.
Figure 27B:
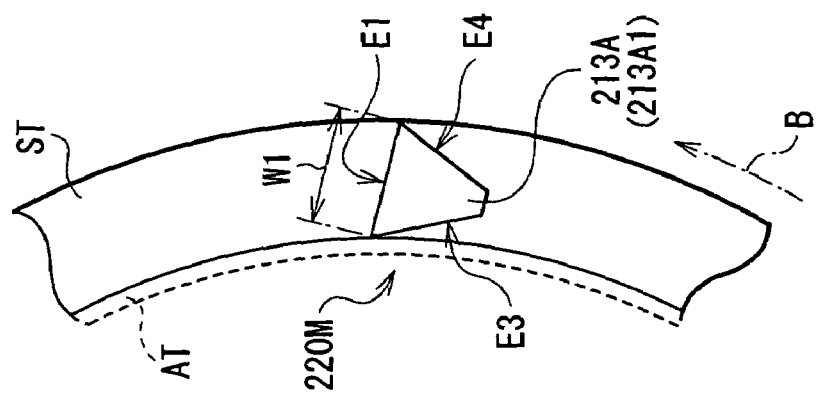
Figure 27A:
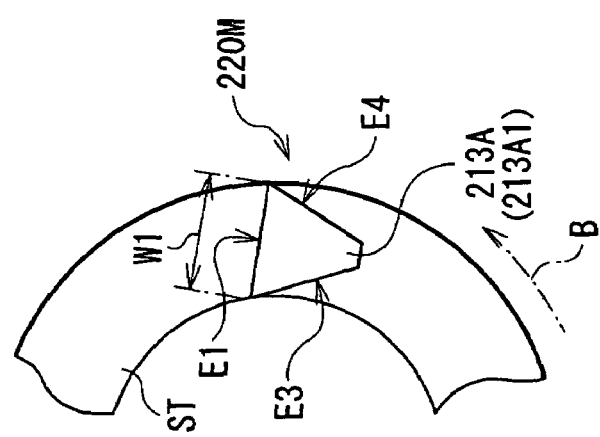

The second comparative example (see FIGS. 27A to 27C) allows satisfactory prevention of the adverse effect resulting from side erase, regardless of the position on the hard disk 300. The reason is as follows. Because of the characteristic configuration of the exposed surface 220M in the shape of the symmetric inverted trapezoid, the side edge E3 does not extend off the target track ST and to the adjacent track AT even when the exposed surface 220M is skewed in the outward direction during the occurrence of skew and is further greatly skewed, as shown in FIGS. 27A to 27C, for example.

Figure 28C:
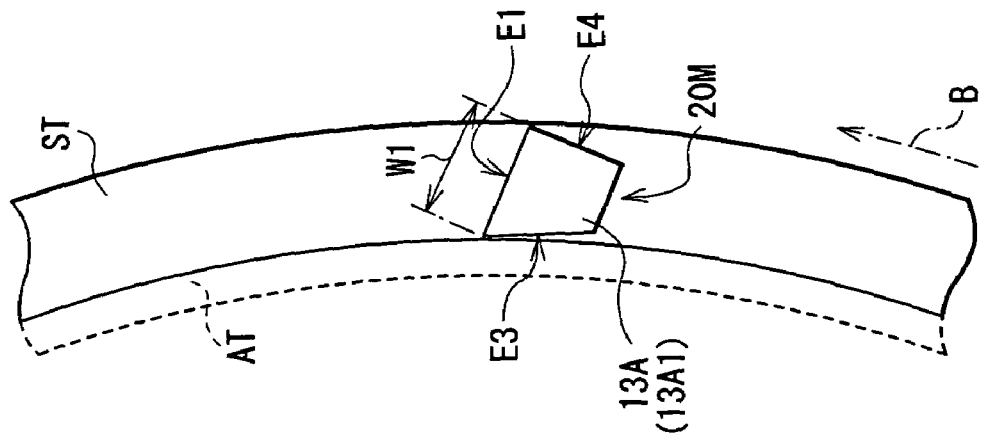
FIGS. 28A to 28C are plan views of assistance in explaining the state of occurrence of side erase which arises when the thin film magnetic head according to the embodiment of the invention is mounted on the hard disk drive shown in FIG. 25.
Figure 28B:
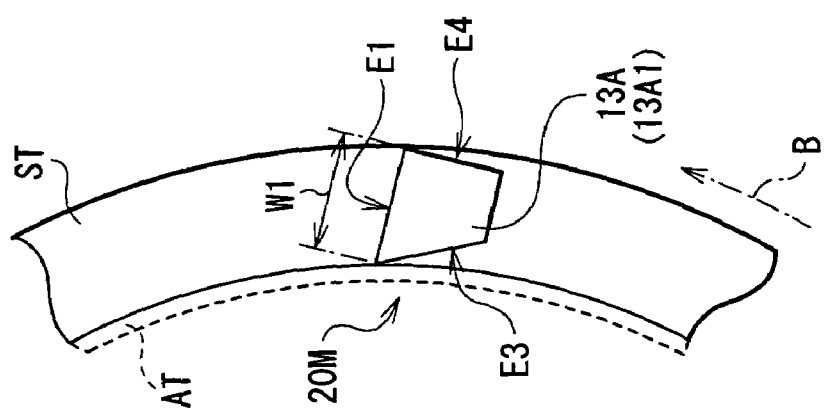
Figure 28A:
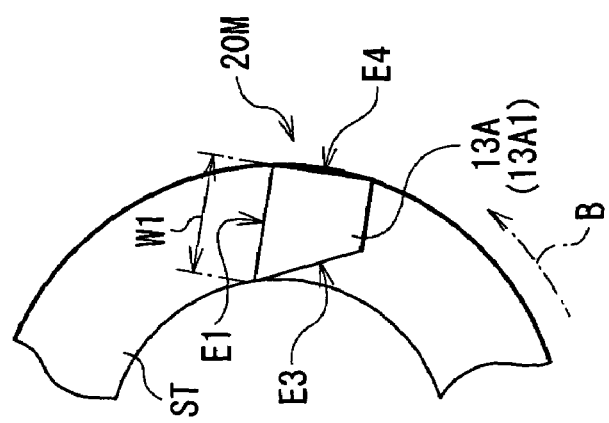

The embodiment (see FIGS. 28A to 28C) allows satisfactory prevention of the adverse effect resulting from side erase. The reason is as follows. Because of the characteristic configuration of the exposed surface 20M in the shape of the asymmetric inverted trapezoid, the side edge E3 does not extend off the target track ST and to the adjacent track AT even in the event of skew, as in the case of the second comparative example, as shown in FIGS. 28A to 28C, for example.

Accordingly, the recording processing using the thin film magnetic head including the magnetic pole portion layer 13A having the exposed surface 20M having the configuration shown in FIG. 24 enables preventing the adverse effect resulting from side erase to such an extent that normal recording operation is not interfered with, as in the case of the above-described embodiment. As a matter of course, the modifications described and shown in FIGS. 10 to 12C may be applied to the exposed surface 20M having the configuration shown in FIG. 24.

As described above, according to the thin film magnetic head of a first aspect of the invention, the magnetic pole end surface is configured to have the shape which is formed by removing the width increasing region, which has the width increasing gradually or stepwise from the medium outflow side to the medium inflow side in the travel direction, from the rectangular region on one side of the rectangular region along the width thereof. For example, the one side of the rectangular region, which the width increasing region is removed from, is determined so as to correspond to the side on which side erase occurs, more specifically the side on which the magnetic flux, which is emitted from the magnetic pole layer onto the target track of the recording medium through the magnetic pole end surface, causes information to unintentionally overwrite existing information recorded on the adjacent track. This allows preventing the magnetic pole end surface from extending to the adjacent track, and also allows ensuring the area of the magnetic pole end surface serving as the outlet through which the magnetic flux is emitted, thus attaining sufficient vertical magnetic field strength. Therefore, the thin film magnetic head of the first aspect enables both ensuring the overwrite characteristics and preventing the adverse effect resulting from side erase.

According to the thin film magnetic head of a second aspect of the invention, the magnetic pole end surface is configured in such a manner that the width of the first edge is greater than the width of the second edge and is equal to or greater than the width of the magnetic pole end surface at any position midway between the first and second edges, and that either the third or fourth edge forms the right angle with the first edge. For example, the shape of the magnetic pole end surface is determined according to the state of occurrence of side erase, while satisfying the above-mentioned conditions. Thus, the thin film magnetic head of the second aspect enables both ensuring the overwrite characteristics and preventing the adverse effect resulting from side erase.

According to the thin film magnetic head of a third aspect of the invention, the magnetic pole end surface is configured to have the shape of the trapezoid having: the first edge which is located on the medium outflow side in the travel direction and is the longer side of the pair of sides parallel to each other, the first edge forming the base angles, one of which is different from the other; and the second edge which is located on the medium inflow side in the travel direction and is the shorter side of the pair of sides. For example, the shape of the magnetic pole end surface is determined according to the state of occurrence of side erase, while satisfying the above-mentioned conditions. Thus, the thin film magnetic head of the third aspect enables both ensuring the overwrite characteristics and preventing the adverse effect resulting from side erase.

According to the method of manufacturing a thin film magnetic head of the first aspect of the invention, the buffer layer made of the material having a lower etching rate than the material of the precursory magnetic pole layer is formed on the precursory magnetic pole layer including the uniform width portion, and then the uniform width portion of the precursory magnetic pole layer is selectively etched on one side along the width, using the buffer layer as the mask, by irradiation with the ion beams at a predetermined angle relative to the direction perpendicular to the extending surface of the precursory magnetic pole layer. Because of the presence of the buffer layer, the uniform width portion is etched on the side farther away from the buffer layer, which has priority over the side closer to the buffer layer. By this etching process, the magnetic pole end surface of the magnetic pole layer completed is configured to have the shape which is formed by removing the width increasing region, which has the width increasing gradually or stepwise from the medium outflow side to the medium inflow side in the travel direction, from the rectangular region on one side of the rectangular region along the width thereof. Moreover, the formation of the magnetic pole layer is excellent in manufacturability because the whole formation is accomplished by the existing etching process. Therefore, the method of the first aspect enables manufacturing, with high manufacturability, the thin film magnetic head including the magnetic pole layer having the magnetic pole end surface having the above-mentioned characteristic configuration.

According to the method of manufacturing a thin film magnetic head of the second aspect of the invention, the buffer layer made of the material having a lower etching rate than the material of the precursory magnetic pole layer is formed on the precursory magnetic pole layer including the uniform width portion, and then the uniform width portion of the precursory magnetic pole layer is selectively etched on one side along the width, using the buffer layer as the mask, by irradiation with the ion beams at a predetermined angle relative to the direction perpendicular to the extending surface of the precursory magnetic pole layer. Thus, the magnetic pole end surface of the magnetic pole layer completed through the existing etching process is configured in such a manner that the width of the first edge is greater than the width of the second edge and is equal to or greater than the width of the magnetic pole end surface at any position midway between the first and second edges, and that either the third or fourth edge forms the right angle with the first edge. Therefore, the method of the second aspect enables manufacturing, with high manufacturability, the thin film magnetic head including the magnetic pole layer having the magnetic pole end surface having the above-mentioned characteristic configuration.

According to the method of manufacturing a thin film magnetic head of the third aspect of the invention, the buffer layer made of the material having a lower etching rate than the material of the precursory magnetic pole layer is formed on the precursory magnetic pole layer including the uniform width portion, and then the uniform width portion of the precursory magnetic pole layer is selectively etched on at least one side along the width, using the buffer layer as the mask, by irradiation with the ion beams at a predetermined angle relative to the direction perpendicular to the extending surface of the precursory magnetic pole layer. Thus, the magnetic pole end surface of the magnetic pole layer completed through the existing etching process has the shape of the trapezoid having: the first edge which is located on the medium outflow side in the travel direction and is the longer side of the pair of sides parallel to each other, the first edge forming the base angles, one of which is different from the other; and the second edge which is located on the medium inflow side in the travel direction and is the shorter side of the pair of sides. Therefore, the method of the third aspect enables manufacturing, with high manufacturability, the thin film magnetic head including the magnetic pole layer having the magnetic pole end surface having the above-mentioned characteristic configuration.

According to the thin film magnetic head of the first aspect of the invention, the track width defining portion is configured to have a portion whose cross section parallel to the recording-medium-facing surface has a smaller area closer to the magnetic pole end surface. Thus, the magnetic flux flows through the track width defining portion and to the magnetic pole end surface while concentrating, and this prevents magnetic flux saturation. Therefore, the thin film magnetic head of the first aspect can guide a necessary and sufficient magnetic flux to the magnetic pole end surface because of preventing the magnetic flux saturation, and can thus ensure the vertical magnetic field strength also in the aspect of the focusing of magnetic flux.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head including:
   a thin film coil for generating a magnetic flux; and
   a magnetic pole layer having a magnetic pole end surface exposed on a recording-medium-facing surface to be faced with a recording medium which moves in a predetermined travel direction, the magnetic pole layer for emitting the magnetic flux generated by the thin film coil onto the recording medium through the magnetic pole end surface,
   wherein the magnetic pole end surface has a shape which is formed by removing a width increasing region, which has a width increasing gradually or stepwise from an edge of the medium outflow side to an edge of the medium inflow side in the travel direction, from a rectangular region on only one side of the rectangular region alone the width thereof, and
   the magnetic pole layer includes a track width defining portion which has the magnetic pole end surface and defines a write track width of the recording medium, and the track width defining portion has a portion whose cross section parallel to the recording-medium-facing surface has a smaller portion closer to the magnetic pole end surface.

2. A thin film magnetic head according to claim 1, wherein the one side of the rectangular region, which the width increasing region is removed from, is the side on which the magnetic flux, which is emitted from the magnetic pole layer onto a target track of the recording medium through the magnetic pole end surface, causes information to overwrite existing information recorded on an adjacent track adjacent to the target track.

3. A thin film magnetic head according to claim 2, wherein the recording medium has the shape of a disc whose center coincides with a predetermined center point, and the one side is the near side with respect to the center point of the recording medium in the radial direction thereof.

4. A thin film magnetic head according to claim 2, wherein the recording medium has the shape of a disc whose center coincides with a predetermined center point, and the one side is the far side with respect to the center point of the recording medium in the radial direction thereof.

5. A thin film magnetic head according to claim 1, wherein the width increasing region has the shape of a right triangle.

6. A thin film magnetic head according to claim 1, wherein the magnetic pole layer is configured to emit, through the magnetic pole end surface, the magnetic flux for magnetizing the recording medium in the direction perpendicular to a surface of the recording medium.

7. The thin film magnetic head according to claim 1, wherein the portion whose cross section parallel to the recording-medium-facing surface has the smaller portion closer to the magnetic pole end surface is a magnetic pole tip portion.

8. A thin film magnetic head including:
a thin film coil for generating a magnetic flux; and
a magnetic pole layer having a magnetic pole end surface exposed on a recording-medium-facing surface to be faced with a recording medium which moves in a predetermined travel direction, the magnetic pole layer for emitting the magnetic flux generated by the thin film coil onto the recording medium through the magnetic pole end surface,
wherein the magnetic pole end surface has the shape of a trapezoid having: a first edge which is located on the medium outflow side in the travel direction and is a longer side of a pair of sides parallel to each other, the first edge forming base angles, one of which is different from the other; and a second edge which is located on the medium inflow side in the travel direction and is a shorter side of the pair of sides, and
wherein the magnetic pole layer includes a track width defining portion which has the magnetic pole end surface and defines a write track width of the recording medium, and the track width defining portion has a magnetic pole tip portion whose cross section parallel to the recording-medium-facing surface has a smaller portion closer to the magnetic pole end surface.

9. A thin film magnetic head according to claim 8, wherein both the one base angle and the other base angle are acute angles.

10. A thin film magnetic head according to claim 8, wherein the one base angle is a right angle, and the other base angle is an acute angle.

11. A thin film magnetic head including:
a thin film coil for generating a magnetic flux; and
a magnetic pole layer having a magnetic pole end surface exposed on a recording-medium-facing surface to be faced with a recording medium which moves in a predetermined travel direction, the magnetic pole layer for emitting the magnetic flux generated by the thin film coil onto the recording medium through the magnetic pole end surface,
wherein the magnetic role end surface has a first edge located on the medium outflow side in the travel direction, a second edge located on the medium inflow side in the travel direction, and third and fourth edges located along the width,
the width of the first edge is greater than the width of the second edge and is greater than the width of the magnetic pole end surface at any position midway between the first and second edges,
either the third or fourth edge forms a right angle with the first edge, and
the magnetic pole layer includes a track width defining portion which has the magnetic pole end surface and defines a write track width of the recording medium, and the track width defining portion has a magnetic pole tip portion whose cross section parallel to the recording-medium-facing surface has a smaller portion closer to the magnetic pole end surface.

12. A thin film magnetic head according to claim 11, wherein the third or fourth edge which forms the right angle with the first edge is located on the opposite side to the side on which the magnetic flux, which is emitted from the magnetic pole layer onto a target track of the recording medium through the magnetic pole end surface, causes information to overwrite existing information recorded on an adjacent track adjacent to the target track.

* * * * *